(12) United States Patent
Sauer

(10) Patent No.: US 12,450,719 B2
(45) Date of Patent: Oct. 21, 2025

(54) IMAGE INSPECTION SYSTEMS AND METHODS FOR INTEGRATING THIRD PARTY ARTIFICIAL INTELLIGENCE PLATFORMS

(71) Applicant: Rapiscan Systems, Inc., Torrance, CA (US)

(72) Inventor: Barry Sauer, Fort Lauderdale, FL (US)

(73) Assignee: Rapiscan Systems, Inc., Torrance, CA (US)

( * ) Notice: Subject to any disclaimer, the term of this patent is extended or adjusted under 35 U.S.C. 154(b) by 507 days.

(21) Appl. No.: 17/811,708

(22) Filed: Jul. 11, 2022

(65) Prior Publication Data

US 2023/0281786 A1 Sep. 7, 2023

Related U.S. Application Data

(60) Provisional application No. 63/268,731, filed on Mar. 1, 2022, provisional application No. 63/221,150, filed on Jul. 13, 2021.

(51) Int. Cl.
*G06T 7/00* (2017.01)
*G01V 5/20* (2024.01)

(52) U.S. Cl.
CPC .............. *G06T 7/0008* (2013.01); *G01V 5/20* (2024.01); *G06T 2207/10116* (2013.01)

(58) Field of Classification Search
CPC ........ G06T 7/0008; G06T 2207/10116; G06T 2207/20081; G06T 7/0004; G06T 7/0002;
(Continued)

(56) References Cited

U.S. PATENT DOCUMENTS 2,636,619 A 4/1953 Alexander
3,275,831 A 9/1966 Martin
(Continued)

FOREIGN PATENT DOCUMENTS

AT 406586 T 9/2008
AT 553401 T 4/2012
(Continued)

OTHER PUBLICATIONS

International Search Report for PCT/US22/73597, Oct. 11, 2022.
(Continued)

*Primary Examiner* — Henok Shiferaw
*Assistant Examiner* — Dion J Satcher
(74) *Attorney, Agent, or Firm* — Novel IP

(57) ABSTRACT

A system for enabling a plurality of different artificial intelligence models to be applied to image data acquired from one or more inspection systems. The system is configured to receive an instruction from an operator workstation to apply one of a plurality of different artificial intelligence (AI) models to an image representative of cargo. Further, an application program interface specific to that one AI model, is acquired. Further, the image is submitted to the AI model using the application program interface and data representative of a degree to which the cargo in the image corresponds to an expected type of cargo based upon descriptive data associated with the cargo, is received from the AI model. Thereafter, the data representative of the degree to which the cargo in the image corresponds to the expected type of cargo is transmitted to the operator workstation, to be displayed to an operator.

26 Claims, 15 Drawing Sheets

(58) Field of Classification Search
CPC .......... G01V 5/20; G01V 5/22; B65G 63/004; B65G 2201/0235; B65G 2203/04; G06V 2201/05; G06V 20/52; G01N 24/084
See application file for complete search history.

(56) References Cited

U.S. PATENT DOCUMENTS

| | | | |
|---|---|---|---|
| 3,374,355 A | 3/1968 | Parratt |
| 3,439,166 A | 4/1969 | Chope |
| 3,837,502 A | 9/1974 | Hornagold |
| 3,904,923 A | 9/1975 | Schwartz |
| 4,164,138 A | 8/1979 | Burkhart |
| 4,239,969 A | 12/1980 | Galetta |
| 4,658,408 A | 4/1987 | Amor |
| 5,014,293 A | 5/1991 | Boyd |
| 5,041,728 A | 8/1991 | Spacher |
| 5,065,418 A | 11/1991 | Bermbach |
| 5,181,234 A | 1/1993 | Smith |
| 5,185,778 A | 2/1993 | Magram |
| 5,197,088 A | 3/1993 | Vincent |
| 5,202,932 A | 4/1993 | Cambier |
| 5,259,012 A | 11/1993 | Baker |
| 5,363,940 A | 11/1994 | Fahrion |
| 5,493,596 A | 2/1996 | Annis |
| 5,503,424 A | 4/1996 | Agopian |
| 5,600,303 A | 2/1997 | Husseiny |
| 5,606,167 A | 2/1997 | Miller |
| 5,692,028 A | 11/1997 | Geus |
| 5,692,029 A | 11/1997 | Husseiny |
| 5,842,578 A | 12/1998 | Cordeiro |
| 5,909,478 A | 6/1999 | Polichar |
| 5,910,973 A | 6/1999 | Grodzins |
| 5,940,468 A | 8/1999 | Huang |
| 5,974,111 A | 10/1999 | Krug |
| 6,056,671 A | 5/2000 | Marmer |
| 6,067,344 A | 5/2000 | Grodzins |
| 6,081,580 A | 6/2000 | Grodzins |
| 6,151,381 A | 11/2000 | Grodzins |
| 6,192,104 B1 | 2/2001 | Adams |
| 6,216,540 B1 | 4/2001 | Nelson |
| 6,220,099 B1 | 4/2001 | Marti |
| 6,249,567 B1 | 6/2001 | Rothschild |
| 6,292,533 B1 | 9/2001 | Swift |
| 6,301,327 B1 | 10/2001 | Martens |
| 6,320,933 B1 | 11/2001 | Grodzins |
| 6,347,132 B1 | 2/2002 | Annis |
| 6,418,194 B1 | 7/2002 | McPherson |
| 6,424,695 B1 | 7/2002 | Grodzins |
| 6,459,761 B1 | 10/2002 | Grodzins |
| 6,459,764 B1 | 10/2002 | Chalmers |
| 6,542,574 B2 | 4/2003 | Grodzins |
| 6,542,580 B1 | 4/2003 | Carver |
| 6,546,072 B1 | 4/2003 | Chalmers |
| 6,552,346 B2 | 4/2003 | Verbinski |
| 6,614,872 B2 | 9/2003 | Bueno |
| 6,658,087 B2 | 12/2003 | Chalmers |
| 6,665,373 B1 | 12/2003 | Kotowski |
| 6,702,459 B2 | 3/2004 | Barnes |
| 6,713,773 B1 | 3/2004 | Lyons |
| 6,843,599 B2 | 1/2005 | Le |
| 6,920,197 B2 | 7/2005 | Kang |
| 6,924,487 B2 | 8/2005 | Bolozdynya |
| 6,928,141 B2 | 8/2005 | Carver |
| 6,940,071 B2 | 9/2005 | Ramsden |
| 6,944,263 B2 | 9/2005 | Xiao |
| 7,010,094 B2 | 3/2006 | Grodzins |
| 7,039,159 B2 | 5/2006 | Muenchau |
| 7,046,768 B1 | 5/2006 | Gilevich |
| 7,095,326 B2 | 8/2006 | Young |
| 7,099,434 B2 | 8/2006 | Adams |
| RE39,396 E | 11/2006 | Swift |
| 7,151,447 B1 | 12/2006 | Willms |
| 7,202,478 B2 | 4/2007 | Ramsden |
| 7,203,276 B2 | 4/2007 | Arsenault |
| 7,207,713 B2 | 4/2007 | Lowman |
| 7,215,737 B2 | 5/2007 | Li |
| 7,215,738 B2 | 5/2007 | Muenchau |
| 7,218,704 B1 | 5/2007 | Adams |
| 7,239,245 B2 | 7/2007 | Kang |
| 7,244,947 B2 | 7/2007 | Polichar |
| 7,302,035 B2 | 11/2007 | Hu |
| 7,322,745 B2 | 1/2008 | Agrawal |
| 7,352,843 B2 | 4/2008 | Hu |
| 7,352,844 B1 | 4/2008 | Muenchau |
| 7,366,282 B2 | 4/2008 | Peschmann |
| 7,369,643 B2 | 5/2008 | Kotowski |
| 7,372,040 B2 | 5/2008 | Polichar |
| 7,379,530 B2 | 5/2008 | Hoff |
| 7,386,093 B2 | 6/2008 | Wu |
| 7,388,209 B1 | 6/2008 | Gormley |
| 7,397,891 B2 | 7/2008 | Johnson |
| 7,399,976 B2 | 7/2008 | Kang |
| 7,400,701 B1 | 7/2008 | Cason |
| 7,400,706 B2 | 7/2008 | Li |
| 7,417,440 B2 | 8/2008 | Peschmann |
| 7,418,077 B2 | 8/2008 | Gray |
| 7,453,987 B1 | 11/2008 | Richardson |
| 7,456,780 B1 | 11/2008 | Garren |
| 7,470,914 B2 | 12/2008 | Li |
| 7,471,764 B2 | 12/2008 | Kaval |
| 7,483,510 B2 | 1/2009 | Carver |
| 7,486,768 B2 | 2/2009 | Allman |
| 7,499,522 B2 | 3/2009 | Chen |
| 7,504,635 B2 | 3/2009 | Ramsden |
| 7,505,556 B2 | 3/2009 | Chalmers |
| 7,508,908 B2 | 3/2009 | Hu |
| 7,512,212 B2 | 3/2009 | Li |
| 7,517,149 B2 | 4/2009 | Agrawal |
| 7,519,148 B2 | 4/2009 | Kotowski |
| 7,525,101 B2 | 4/2009 | Grodzins |
| 7,526,064 B2 | 4/2009 | Akery |
| 7,538,325 B2 | 5/2009 | Mishin |
| 7,547,887 B2 | 6/2009 | Ramsden |
| 7,555,099 B2 | 6/2009 | Rothschild |
| 7,570,737 B2 | 8/2009 | Kang |
| 7,579,845 B2 | 8/2009 | Peschmann |
| 7,580,505 B2 | 8/2009 | Kang |
| 7,593,506 B2 | 9/2009 | Cason |
| 7,593,510 B2 | 9/2009 | Rothschild |
| 7,596,275 B1 | 9/2009 | Richardson |
| 7,634,055 B2 | 12/2009 | Hu |
| 7,647,189 B2 | 1/2010 | Kang |
| 7,660,388 B2 | 2/2010 | Gray |
| 7,663,109 B2 | 2/2010 | Kang |
| 7,683,336 B2 | 3/2010 | Ramsden |
| 7,684,538 B2 | 3/2010 | Morton |
| 7,684,541 B2 | 3/2010 | Wang |
| 7,702,070 B2 | 4/2010 | Kang |
| 7,720,195 B2 | 5/2010 | Allman |
| 7,722,251 B2 | 5/2010 | Kang |
| 7,724,868 B2 | 5/2010 | Morton |
| 7,742,568 B2 | 6/2010 | Smith |
| 7,760,852 B2 | 7/2010 | Chen |
| 7,769,133 B2 | 8/2010 | Carver |
| 7,783,004 B2 | 8/2010 | Kotowski |
| 7,783,005 B2 | 8/2010 | Kaval |
| 7,807,964 B2 | 10/2010 | Li |
| 7,817,775 B2 | 10/2010 | Kang |
| 7,817,776 B2 | 10/2010 | Agrawal |
| 7,820,973 B2 | 10/2010 | Ruan |
| 7,852,981 B2 | 12/2010 | Luo |
| 7,856,081 B2 | 12/2010 | Peschmann |
| 7,860,213 B2 | 12/2010 | Akery |
| 7,864,920 B2 | 1/2011 | Rothschild |
| 7,876,879 B2 | 1/2011 | Morton |
| 7,876,880 B2 | 1/2011 | Kotowski |
| 7,903,789 B2 | 3/2011 | Morton |
| 7,915,596 B2 | 3/2011 | Clothier |
| 7,924,975 B2 | 4/2011 | Zhang |
| 7,928,400 B1 | 4/2011 | Diawara |
| 7,929,663 B2 | 4/2011 | Morton |
| 7,942,576 B2 | 5/2011 | Zhao |
| 7,947,957 B2 | 5/2011 | Ruan |
| 7,949,101 B2 | 5/2011 | Morton |

(56) References Cited

U.S. PATENT DOCUMENTS

| | | |
|---|---|---|
| 7,963,695 B2 | 6/2011 | Kotowski |
| 7,982,191 B2 | 7/2011 | Friedman |
| 7,991,113 B2 | 8/2011 | Carver |
| 7,991,133 B2 | 8/2011 | Mills |
| 7,995,705 B2 | 8/2011 | Allman |
| 7,995,707 B2 | 8/2011 | Rothschild |
| 8,013,297 B2 | 9/2011 | Peng |
| 8,054,938 B2 | 11/2011 | Kaval |
| 8,059,781 B2 | 11/2011 | Agrawal |
| 8,073,099 B2 | 12/2011 | Niu |
| 8,084,748 B2 | 12/2011 | Peng |
| 8,085,897 B2 | 12/2011 | Morton |
| 8,094,784 B2 | 1/2012 | Morton |
| 8,129,691 B2 | 3/2012 | Hu |
| 8,135,110 B2 | 3/2012 | Morton |
| 8,138,770 B2 | 3/2012 | Peschmann |
| 8,170,177 B2 | 5/2012 | Akery |
| 8,204,173 B2 | 6/2012 | Betcke |
| 8,217,365 B2 | 7/2012 | Chen |
| 8,223,919 B2 | 7/2012 | Morton |
| 8,243,876 B2 | 8/2012 | Morton |
| 8,247,776 B2 | 8/2012 | Peng |
| 8,275,091 B2 | 9/2012 | Morton |
| 8,288,718 B2 | 10/2012 | Li |
| 8,319,188 B2 | 11/2012 | Ramsden |
| 8,325,871 B2 | 12/2012 | Grodzins |
| 8,331,535 B2 | 12/2012 | Morton |
| 8,345,819 B2 | 1/2013 | Mastronardi |
| 8,356,937 B2 | 1/2013 | Kotowski |
| 8,374,310 B2 | 2/2013 | Kang |
| 8,374,993 B2 | 2/2013 | Ramsden |
| 8,384,016 B2 | 2/2013 | Ramsden |
| 8,385,501 B2 | 2/2013 | Allman |
| 8,389,942 B2 | 3/2013 | Morton |
| 8,396,189 B2 | 3/2013 | Kang |
| 8,428,217 B2 | 4/2013 | Peschmann |
| 8,433,036 B2 | 4/2013 | Morton |
| 8,439,565 B2 | 5/2013 | Mastronardi |
| 8,442,186 B2 | 5/2013 | Rothschild |
| 8,451,974 B2 | 5/2013 | Morton |
| 8,457,274 B2 | 6/2013 | Arodzero |
| 8,457,275 B2 | 6/2013 | Akery |
| 8,477,902 B2 | 7/2013 | Li |
| 8,483,356 B2 | 7/2013 | Bendahan |
| 8,491,189 B2 | 7/2013 | Kotowski |
| 8,503,605 B2 | 8/2013 | Morton |
| 8,503,606 B2 | 8/2013 | Rothschild |
| 8,532,823 B2 | 9/2013 | McElroy |
| 8,552,722 B2 | 10/2013 | Lionheart |
| 8,559,592 B2 | 10/2013 | Betcke |
| 8,579,506 B2 | 11/2013 | Morton |
| 8,582,857 B2 | 11/2013 | Chen |
| 8,625,735 B2 | 1/2014 | Morton |
| 8,644,453 B2 | 2/2014 | Morton |
| 8,668,386 B2 | 3/2014 | Morton |
| 8,674,706 B2 | 3/2014 | Peschmann |
| 8,679,409 B2 | 3/2014 | Zhang |
| 8,687,765 B2 | 4/2014 | Kotowski |
| 8,690,427 B2 | 4/2014 | Mastronardi |
| 8,735,833 B2 | 5/2014 | Morton |
| 8,750,452 B2 | 6/2014 | Kaval |
| 8,774,357 B2 | 7/2014 | Morton |
| 8,798,232 B2 | 8/2014 | Bendahan |
| 8,804,899 B2 | 8/2014 | Morton |
| 8,824,632 B2 | 9/2014 | Mastronardi |
| 8,824,637 B2 | 9/2014 | Morton |
| 8,831,176 B2 | 9/2014 | Morton |
| 8,831,305 B2 | 9/2014 | Zhang |
| 8,837,669 B2 | 9/2014 | Morton |
| 8,837,670 B2 | 9/2014 | Akery |
| 8,840,303 B2 | 9/2014 | Morton |
| 8,842,808 B2 | 9/2014 | Rothschild |
| 8,859,981 B1 | 10/2014 | Stoian |
| 8,861,684 B2 | 10/2014 | Al-Kofahi |
| 8,885,794 B2 | 11/2014 | Morton |
| 8,908,831 B2 | 12/2014 | Bendahan |
| 8,913,707 B2 | 12/2014 | Kang |
| 8,929,509 B2 | 1/2015 | Morton |
| 8,958,526 B2 | 2/2015 | Morton |
| 8,971,485 B2 | 3/2015 | Morton |
| 8,971,487 B2 | 3/2015 | Mastronardi |
| 8,983,033 B2 | 3/2015 | Chen |
| 8,993,970 B2 | 3/2015 | Morton |
| 9,001,973 B2 | 4/2015 | Morton |
| 9,014,339 B2 | 4/2015 | Grodzins |
| 9,020,095 B2 | 4/2015 | Morton |
| 9,020,096 B2 | 4/2015 | Allman |
| 9,020,103 B2 | 4/2015 | Grodzins |
| 9,025,731 B2 | 5/2015 | Kotowski |
| 9,036,779 B2 | 5/2015 | Morton |
| 9,037,342 B2 | 5/2015 | Shi |
| 9,042,511 B2 | 5/2015 | Peschmann |
| 9,046,465 B2 | 6/2015 | Thompson |
| 9,046,613 B2 | 6/2015 | Ramsden |
| 9,048,061 B2 | 6/2015 | Morton |
| 9,052,271 B2 | 6/2015 | Grodzins |
| 9,052,403 B2 | 6/2015 | Morton |
| 9,057,679 B2 | 6/2015 | Morton |
| 9,081,099 B2 | 7/2015 | Kang |
| 9,086,497 B2 | 7/2015 | Bendahan |
| 9,093,245 B2 | 7/2015 | Morton |
| 9,099,279 B2 | 8/2015 | Rommel |
| 9,111,331 B2 | 8/2015 | Parikh |
| 9,113,839 B2 | 8/2015 | Morton |
| 9,117,564 B2 | 8/2015 | Rommel |
| 9,121,958 B2 | 9/2015 | Morton |
| 9,128,200 B2 | 9/2015 | Muenster |
| 9,146,201 B2 | 9/2015 | Schubert |
| 9,158,027 B2 | 10/2015 | Morton |
| 9,158,030 B2 | 10/2015 | Morton |
| 9,182,515 B2 | 11/2015 | Stoian |
| 9,183,647 B2 | 11/2015 | Morton |
| 9,208,988 B2 | 12/2015 | Morton |
| 9,218,933 B2 | 12/2015 | Langeveld |
| 9,223,049 B2 | 12/2015 | Kotowski |
| 9,223,050 B2 | 12/2015 | Kaval |
| 9,223,052 B2 | 12/2015 | Morton |
| 9,257,208 B2 | 2/2016 | Rommel |
| 9,263,225 B2 | 2/2016 | Morton |
| 9,268,027 B2 | 2/2016 | Kang |
| 9,268,044 B2 | 2/2016 | Ramsden |
| 9,268,058 B2 | 2/2016 | Peschmann |
| 9,274,065 B2 | 3/2016 | Morton |
| 9,279,901 B2 | 3/2016 | Akery |
| 9,285,488 B2 | 3/2016 | Arodzero |
| 9,285,498 B2 | 3/2016 | Carver |
| 9,291,582 B2 | 3/2016 | Grodzins |
| 9,310,322 B2 | 4/2016 | Panesar |
| 9,310,323 B2 | 4/2016 | Bendahan |
| 9,316,760 B2 | 4/2016 | Bendahan |
| 9,329,285 B2 | 5/2016 | Gozani |
| 9,332,624 B2 | 5/2016 | Morton |
| 9,417,060 B1 | 8/2016 | Schubert |
| 9,420,677 B2 | 8/2016 | Morton |
| 9,442,082 B2 | 9/2016 | Morton |
| 9,465,119 B2 | 10/2016 | Manslow |
| 9,466,456 B2 | 10/2016 | Rommel |
| 9,535,019 B1 | 1/2017 | Rothschild |
| 9,535,177 B2 | 1/2017 | Ramsden |
| 9,541,510 B2 | 1/2017 | Arodzero |
| 9,568,637 B2 | 2/2017 | Stoian |
| 9,576,766 B2 | 2/2017 | Morton |
| 9,606,259 B2 | 3/2017 | Morton |
| 9,618,648 B2 | 4/2017 | Morton |
| 9,632,206 B2 | 4/2017 | Parikh |
| 9,638,646 B2 | 5/2017 | Morton |
| 9,658,343 B2 | 5/2017 | Arodzero |
| 9,675,306 B2 | 6/2017 | Morton |
| 9,688,517 B2 | 6/2017 | Morton |
| 9,714,920 B2 | 7/2017 | Lionheart |
| 9,720,111 B2 | 8/2017 | Ramsden |
| 9,726,619 B2 | 8/2017 | Thompson |
| 9,747,678 B2 | 8/2017 | Chen |
| 9,747,705 B2 | 8/2017 | Morton |

(56) References Cited

U.S. PATENT DOCUMENTS

| | | |
|---|---|---|
| 9,817,151 B2 | 11/2017 | Morton |
| 9,880,315 B2 | 1/2018 | Stoian |
| 9,958,569 B2 | 5/2018 | Morton |
| 10,007,019 B2 | 6/2018 | Morton |
| 10,032,021 B2 | 7/2018 | Pedersen |
| 10,107,783 B2 | 10/2018 | Lionheart |
| 10,126,442 B2 | 11/2018 | Ramsden |
| 10,175,381 B2 | 1/2019 | Morton |
| 10,228,487 B2 * | 3/2019 | Mastronardi .......... G01N 23/04 |
| 10,274,636 B2 | 4/2019 | Tang |
| 10,295,483 B2 | 5/2019 | Morton |
| 10,302,807 B2 | 5/2019 | Yu |
| 10,310,102 B2 | 6/2019 | Ramsden |
| 10,317,566 B2 | 6/2019 | Morton |
| 10,351,967 B2 | 7/2019 | Wang |
| 10,388,818 B2 | 8/2019 | Zhang |
| 10,408,967 B2 | 9/2019 | Morton |
| 10,422,919 B2 | 9/2019 | Parikh |
| 10,429,523 B2 | 10/2019 | Ramsden |
| 10,473,795 B2 | 11/2019 | Wang |
| 10,483,077 B2 | 11/2019 | Morton |
| 10,509,142 B2 | 12/2019 | Parikh |
| 10,585,207 B2 | 3/2020 | Morton |
| 10,586,324 B2 | 3/2020 | Zhao |
| 10,591,424 B2 | 3/2020 | Morton |
| 10,646,179 B2 | 5/2020 | Xu |
| 10,663,413 B2 * | 5/2020 | Li ................. G01N 23/046 |
| 10,663,616 B2 | 5/2020 | Morton |
| 10,677,943 B2 | 6/2020 | Moore |
| 10,692,228 B2 | 6/2020 | Burgett |
| 10,739,491 B2 | 8/2020 | Yang |
| 10,768,338 B2 * | 9/2020 | Yu .................. G06T 7/62 |
| 10,775,320 B2 | 9/2020 | Li |
| 10,826,606 B1 | 11/2020 | Lundberg |
| 10,830,920 B2 | 11/2020 | Parikh |
| 10,901,112 B2 | 1/2021 | Morton |
| 10,976,271 B2 | 4/2021 | Morton |
| 10,990,895 B2 | 4/2021 | Deluca |
| 11,054,370 B2 | 7/2021 | Reynaud |
| 11,099,294 B2 | 8/2021 | Parikh |
| 11,287,391 B2 | 3/2022 | Yu |
| 12,174,334 B2 * | 12/2024 | Parikh ................ G06Q 10/0838 |
| 2002/0094064 A1 | 7/2002 | Zhou |
| 2003/0043964 A1 | 3/2003 | Sorenson |
| 2003/0068557 A1 | 4/2003 | Kumashiro |
| 2004/0051265 A1 | 3/2004 | Nadeau |
| 2004/0120454 A1 | 6/2004 | Ellenbogen |
| 2004/0141584 A1 | 7/2004 | Bernardi |
| 2004/0252024 A1 | 12/2004 | Huey |
| 2004/0258198 A1 | 12/2004 | Carver |
| 2005/0023479 A1 | 2/2005 | Grodzins |
| 2005/0024199 A1 | 2/2005 | Huey |
| 2005/0100135 A1 | 5/2005 | Lowman |
| 2005/0117683 A1 | 6/2005 | Mishin |
| 2005/0135668 A1 | 6/2005 | Polichar |
| 2005/0157842 A1 | 7/2005 | Agrawal |
| 2005/0169421 A1 | 8/2005 | Muenchau |
| 2005/0198226 A1 | 9/2005 | DeLia |
| 2006/0027751 A1 | 2/2006 | Kurita |
| 2006/0056584 A1 | 3/2006 | Allman |
| 2006/0114477 A1 | 6/2006 | Cox |
| 2006/0140341 A1 | 6/2006 | Carver |
| 2006/0182221 A1 | 8/2006 | Bernhardt |
| 2006/0241999 A1 | 10/2006 | Tsyganskiy |
| 2006/0249685 A1 | 11/2006 | Tanaka |
| 2006/0257005 A1 | 11/2006 | Bergeron |
| 2006/0284094 A1 | 12/2006 | Inbar |
| 2007/0085010 A1 | 4/2007 | Letant |
| 2007/0140423 A1 | 6/2007 | Foland |
| 2007/0172129 A1 | 7/2007 | Tortora |
| 2007/0189454 A1 | 8/2007 | Georgeson |
| 2007/0210255 A1 | 9/2007 | Bjorkholm |
| 2007/0228284 A1 | 10/2007 | Polichar |
| 2007/0237293 A1 | 10/2007 | Singh |
| 2007/0280502 A1 | 12/2007 | Paresi |
| 2008/0037707 A1 | 2/2008 | Rothschild |
| 2008/0048872 A1 | 2/2008 | Frank |
| 2008/0084963 A1 | 4/2008 | Clayton |
| 2008/0128624 A1 | 6/2008 | Cooke |
| 2008/0159591 A1 | 7/2008 | Ruedin |
| 2008/0170670 A1 | 7/2008 | Bhatt |
| 2008/0198970 A1 | 8/2008 | Kirshner |
| 2008/0205594 A1 | 8/2008 | Bjorkholm |
| 2008/0230709 A1 | 9/2008 | Tkaczyk |
| 2008/0260097 A1 | 10/2008 | Anwar |
| 2008/0304622 A1 | 12/2008 | Morton |
| 2009/0067575 A1 | 3/2009 | Seppi |
| 2009/0086907 A1 | 4/2009 | Smith |
| 2009/0116617 A1 | 5/2009 | Mastronardi |
| 2009/0127459 A1 | 5/2009 | Neustadter |
| 2009/0168964 A1 | 7/2009 | Safai |
| 2009/0238336 A1 | 9/2009 | Akery |
| 2009/0245462 A1 | 10/2009 | Agrawal |
| 2009/0257555 A1 | 10/2009 | Chalmers |
| 2009/0285353 A1 | 11/2009 | Ellenbogen |
| 2009/0316851 A1 | 12/2009 | Oosaka |
| 2010/0020937 A1 | 1/2010 | Hautmann |
| 2010/0161504 A1 | 6/2010 | Casey |
| 2010/0177868 A1 | 7/2010 | Smith |
| 2010/0177873 A1 | 7/2010 | Chen |
| 2010/0295689 A1 | 11/2010 | Armistead, Jr. |
| 2011/0019797 A1 | 1/2011 | Morton |
| 2011/0019799 A1 | 1/2011 | Shedlock |
| 2011/0038453 A1 | 2/2011 | Morton |
| 2011/0064192 A1 | 3/2011 | Morton |
| 2011/0075808 A1 | 3/2011 | Rothschild |
| 2011/0204243 A1 | 8/2011 | Bendahan |
| 2011/0235777 A1 | 9/2011 | Gozani |
| 2011/0266643 A1 | 11/2011 | Engelmann |
| 2012/0099710 A1 | 4/2012 | Kotowski |
| 2012/0104276 A1 | 5/2012 | Miller |
| 2012/0116720 A1 | 5/2012 | Klann |
| 2013/0001048 A1 | 1/2013 | Panesar |
| 2013/0268285 A1 | 10/2013 | Backes |
| 2014/0185771 A1 | 7/2014 | Morton |
| 2014/0197321 A1 | 7/2014 | Bendahan |
| 2015/0036798 A1 | 2/2015 | Morton |
| 2015/0078519 A1 | 3/2015 | Morton |
| 2015/0301220 A1 | 10/2015 | Morton |
| 2015/0355117 A1 | 12/2015 | Morton |
| 2015/0355369 A1 | 12/2015 | Morton |
| 2016/0025889 A1 | 1/2016 | Morton |
| 2016/0033674 A1 | 2/2016 | Allman |
| 2017/0242148 A1 | 8/2017 | Yu |
| 2018/0031152 A1 | 2/2018 | Rajagopalan |
| 2019/0156942 A1 | 5/2019 | Pronk |
| 2019/0234797 A1 | 8/2019 | Ramer |
| 2020/0051017 A1 * | 2/2020 | Dujmic .............. G06Q 10/0835 |
| 2020/0184612 A1 | 6/2020 | Marais |
| 2020/0394451 A1 * | 12/2020 | Baijal ....... G06N 3/08 |
| 2021/0026953 A1 | 1/2021 | Murphy |
| 2021/0034865 A1 * | 2/2021 | Nord ..................... G06F 18/254 |
| 2021/0090192 A1 | 3/2021 | Norton |
| 2021/0118274 A1 | 4/2021 | Cornell |
| 2022/0036066 A1 * | 2/2022 | Cho ..................... G06F 18/214 |
| 2022/0114722 A1 * | 4/2022 | Meriguet ............... G06V 10/82 |
| 2022/0179661 A1 * | 6/2022 | Kim .......... G06N 7/01 |
| 2022/0189005 A1 * | 6/2022 | Ge .......... G06N 20/00 |

FOREIGN PATENT DOCUMENTS

| | | |
|---|---|---|
| AU | 2008267661 B2 | 4/2011 |
| AU | 2008267660 B2 | 6/2011 |
| AU | 2014299147 B2 | 10/2016 |
| AU | 2018254414 A1 | 10/2019 |
| CA | 2481596 C | 11/2009 |
| EP | 0077018 A1 | 4/1983 |
| EP | 0919186 A2 | 6/1999 |
| EP | 1413898 A1 | 4/2004 |
| EP | 1328827 B1 | 8/2008 |
| EP | 2102636 B1 | 4/2012 |
| EP | 2019974 B1 | 8/2013 |
| EP | 2593813 B1 | 4/2014 |
| EP | 2075595 B1 | 4/2015 |

(56) References Cited

FOREIGN PATENT DOCUMENTS

| | | | |
|---|---|---|---|
| EP | 2047293 B1 | 5/2015 | |
| EP | 2705386 B1 | 9/2015 | |
| EP | 2113791 B1 | 8/2016 | |
| EP | 2883085 B1 | 8/2018 | |
| EP | 1749220 B1 | 10/2019 | |
| EP | 2287636 B1 | 10/2019 | |
| EP | 3077852 B1 | 12/2019 | |
| EP | 2778716 B1 | 4/2020 | |
| EP | 3474292 B1 | 9/2020 | |
| EP | 3505975 B1 | 1/2021 | |
| GB | 2255634 A | 11/1992 | |
| GB | 2409268 A | 6/2005 | |
| GB | 2401766 B | 3/2006 | |
| GB | 2424065 A | 9/2006 | |
| GB | 2418015 B | 12/2006 | |
| GB | 2438317 A | 11/2007 | |
| GB | 2445578 B | 1/2009 | |
| GB | 2440588 B | 9/2009 | |
| GB | 2432094 B | 4/2010 | |
| GB | 2463254 B | 7/2010 | |
| GB | 2437979 B | 12/2010 | |
| GB | 2463707 B | 6/2011 | |
| GB | 2472420 B | 2/2012 | |
| GB | 2455906 B | 6/2012 | |
| GB | 2490513 B | 11/2015 | |
| GB | 2499391 B | 11/2015 | |
| GB | 2504771 B | 2/2016 | |
| GB | 2522017 B | 9/2017 | |
| GB | 2520762 B | 4/2018 | |
| GB | 2525826 B | 9/2020 | |
| GB | 2555564 B | 9/2020 | |
| GB | 2560552 B | 9/2020 | |
| GB | 2577909 B | 11/2020 | |
| GB | 2552538 B | 12/2020 | |
| KR | 20210062477 A | * 5/2021 | ......... G06F 18/2413 |
| WO | 1998055851 A1 | 12/1998 | |
| WO | 2004010127 A1 | 1/2004 | |
| WO | 2005098400 | 10/2005 | |
| WO | 2006036076 A1 | 4/2006 | |
| WO | 2006053279 A2 | 5/2006 | |
| WO | 2006078691 A2 | 7/2006 | |
| WO | 2007035359 A2 | 3/2007 | |
| WO | 2007055720 A2 | 5/2007 | |
| WO | 2007068933 A1 | 6/2007 | |
| WO | 2007103216 A2 | 9/2007 | |
| WO | 2008017983 | 2/2008 | |
| WO | 2009106803 A2 | 9/2009 | |
| WO | 2009143169 A1 | 11/2009 | |
| WO | 2011069024 A1 | 6/2011 | |
| WO | 2011091070 A2 | 7/2011 | |
| WO | 2013116549 A1 | 8/2013 | |
| WO | 2013119423 A1 | 8/2013 | |
| WO | 2014107675 | 7/2014 | |
| WO | 2014121097 A1 | 8/2014 | |
| WO | 2014124152 A2 | 8/2014 | |
| WO | 2016011205 | 1/2016 | |

OTHER PUBLICATIONS

CRS Report for Congress, Aviation Security Technologies and Procedures: Screening Passengers and Baggage, Oct. 26, 2001, pp. 1-12.
International Search Report for PCT/US2015/040653, Dec. 16, 2015.
International Search Report for PCT/US14/56652, Apr. 27, 2015.
International Search Report for PCT/US14/14198, May 16, 2014.
International Preliminary Report on Patentability for PCT/US2014/014198, Aug. 4, 2015.
International Search Report for PCT/US11/21758; Jul. 7, 2011, Rapiscan Systems Inc.
International Preliminary Report on Patentability for PCT/US11/21758, Jul. 7, 2011.
Written Opinion on Patentability for PCT/US11/21758; Jul. 7, 2011; Rapiscan Systems.
Molchanov P A et al: 'Nanosecond gated optical sensors for ocean optic applications' Sensors Applications Symposium, 2006. Proceedings of The 2006 IEEE Houston, Texas, USA Feb. 7-9, 2006, Piscataway, NJ, USA, IEEE, Feb. 7, 2006 (Feb. 7, 2006), pp. 147-150, XP010917671 ISBN: 978-0-7803-9580-0.
"Mobile X-Ray Inspection Systems" Internet citation Feb. 12, 2007, pp. 1-2, XP007911046 Retrieved from the Internet: URL:http://web.archive.org/web/20070212000928/http://www.bombdetection.co-m/cat.sub.--details.php?catid=20> [retrieved on Jan. 6, 2010]. . . .
International Search Report for PCT/GB09/00575, Apr. 7, 2010.
International Search Report for PCT/GB2009/000497, Jan. 22, 2010.
Smith C. R. et al: 'Application of 450 kV computed tomography to engine blocks with steel liners' Materials Evaluation vol. 65, No. 5, 2007, pp. 458-461, XP055108238.
International Search Report for PCT/US13/23676, Jun. 28, 2013.
International Search Report for PCT/US13/24191, Rapiscan Systems Inc., mailed on Jun. 25, 2013.
International Search Report for PCT/US2014/010370, May 13, 2014.
International Search Report for PCT/US10/58809; Rapiscan Systems Inc.; Apr. 19, 2011.
International Search Report for PCT/US2014/015126, May 27, 2014.
Written Opinion of the International Searching Authority for PCT/US2014/015126, May 27, 2014.
International Search Report for PCT/US2012/054110, Dec. 24, 2012.
International Search Report for PCT/US23/27525, Mar. 26, 2024.
Anonymous: "API—Wikipedia", Jul. 10, 2021 (Jul. 10, 2021), XP093271438, Retrieved from the Internet: URL:https://en.wikipedia.org/w/index.php?title=API&oldid=1032892664.

* cited by examiner

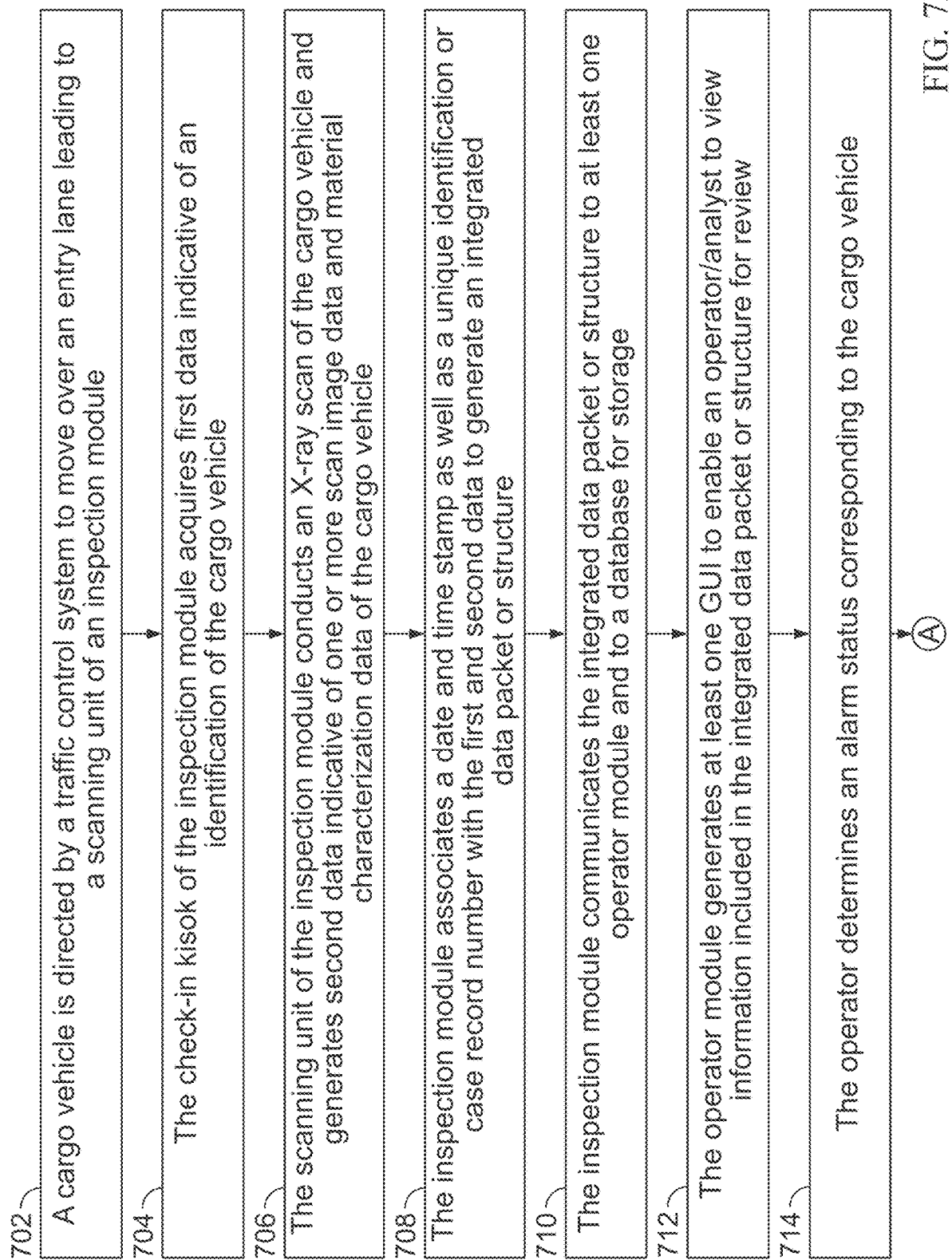

| Operator Audit Trail | X |
|---|---|
| Level 1 Operator | |
| Operator ID | rajcvi |
| Decision | Accepted |
| Decision Reason | Operator Accepted |
| Comments | |
| Scanning Time | 10/04/2018 11:41:08 PM |
| Rendered Time for Inspection | 10/04/2018 11:41:29 PM |
| Decision Submitted Time | 10/04/2018 11:41:41 PM |
| Image Operations Log | View1 - Inverse Edge Detection,High Z |
| User Group | IN |
| Image ID | eae195e2-5a95-424c-b8c1-50c83a90329a |

FIG. 7C

IMAGE INSPECTION SYSTEMS AND METHODS FOR INTEGRATING THIRD PARTY ARTIFICIAL INTELLIGENCE PLATFORMS

CROSS-REFERENCE

The present specification relies on U.S. Patent Provisional Application No. 63/221,150, titled "Image Inspection Systems and Methods for Integrating Third Party Artificial Intelligence Platforms", filed on Jul. 13, 2021 and U.S. Patent Provisional Application No. 63/268,731, titled "Image Inspection Systems and Methods for Integrating Third Party Artificial Intelligence Platforms", filed on Mar. 1, 2022, for priority, both of which are herein incorporate by reference in their entirety.

FIELD

The present invention relates to performing security inspection operation, and more particularly to systems and methods for performing security inspection operations by accessing, through a common hosted service, a variety of artificial intelligence analytical services operating on third-party platforms.

BACKGROUND

The globalization of trade has opened international boundaries for the exchange of goods but has also paved the way for the illegal transportation of contraband such as explosives, narcotics, counterfeit goods, undisclosed currency, chemical, and nuclear weapons. To determine the legitimacy and applicable import laws for a given shipment of cargo, cargo containers are typically associated with a corresponding manifest document, which is an electronic or physical document having descriptive information about the cargo containers such as bills, the shipment consigner, consignee, cargo description, amount, value, origin, and/or destination. The manifest enables individuals at import or export checkpoints to determine whether transporting cargo is permitted and, if so, what duties, costs, or fees may be associated therewith.

At transportation centers, such as ports or airports, the cargo must be inspected, often physically, to determine if the cargo contents correspond with the manifest. More frequently, this inspection is being done using radiation-based systems which enable the rapid imaging of cargo contents without the delays typically caused by physical inspection. However, security systems at the transportation centers are limited in their ability to accurately detect contraband or other dangerous objects, which are often well hidden in the cargo containers. In particular, the detection of the contraband is difficult since corresponding images are superimposed, confounding permitted cargo with the contraband, thereby resulting in an interpretation of threat levels associated with the corresponding images difficult to determine. Further, an operator, at all times, must analyze the images to detect the level of threat associated with the corresponding objects in the images, thus, making it prone to human errors and adding excessive time into the process. Therefore, automated systems, to the extent they can be accurate in determining whether the cargo contents match a manifest and/or contain contraband, would be preferred over manual inspection operations.

U.S. Pat. No. 9,111,331B2 discloses an X-ray inspection system that integrates manifest data for cargo and light vehicles with the X-ray images generated during scanning. Another reference, U.S. Pat. No. 10,509,142B2 also discloses an X-ray inspection system that integrates manifest data for cargo and light vehicles with the X-ray images generated during scanning. Further, the X-ray inspection systems disclosed in U.S. Pat. Nos. 9,111,331B2 and 10,509,142B2 enable the cargo to be withheld for further inspection, in case of a mismatch between cargo contents shown by manifest data and the X-ray images generated during scanning.

However, despite the success and improvements to the speed and accuracy of inspection systems using the aforementioned inventions, there is still a need for improvements to the security inspection process that could better leverage artificial intelligence (AI) and that could more expansively allow for the integration of new analytical approaches, as they are developed. Therefore, there is a need for an improved system and method for performing a security inspection operation that is efficient and can overcome the abovementioned drawbacks.

There is additionally a need to enable different inspection systems, which may be managed by different ports, authorities, or countries, to easily share developed artificial intelligence based models for inspecting different types of goods. For example, certain jurisdictions may have a greater volume of a particular type of goods and, as a result, develop highly sophisticated AI models specific to that type of good. Those jurisdictions may want to share those models with other jurisdictions; however, currently, there is no easy way to do so.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed technology.

SUMMARY

The following embodiments and aspects thereof are described and illustrated in conjunction with systems, tools and methods, which are meant to be exemplary and illustrative, and not limiting in scope. The present application discloses numerous embodiments.

In some embodiments, the present specification discloses a computer readable non-transitory medium comprising a plurality of executable programmatic instructions that, when executed in a computer system, enables a plurality of different artificial intelligence models to be applied to image data, wherein the image data is acquired from one or more inspection systems and wherein the plurality of executable programmatic instructions, when executed: receive an instruction to apply one of the plurality of different artificial intelligence models to said image data, wherein the image data is at least partially representative of cargo, wherein said cargo has descriptive data associated therewith, and wherein said instruction is received from an operator workstation in data communication with at least one of the one or more inspection systems; acquire an application program interface specific to said one of the plurality of different artificial intelligence models, wherein the application program interface is configured to enable the one of the plurality of different artificial intelligence models to be applied to the image; cause the one of the plurality of different artificial intelligence models to be applied to the image data using the acquired application program interface; receive from the one of the plurality of different artificial intelligence models data representative of a degree to which said cargo in the image data corresponds to an expected type of cargo based upon the descriptive data associated with said cargo; and transmit the data representative of the degree to which the cargo in the image corresponds to the expected type of cargo to the operator workstation and cause said data representative of the degree to which the cargo in the image data corresponds to the expected type of cargo to be displayed on the operator workstation.

Optionally, each of the plurality of different artificial intelligence models are specific to one type of cargo, to one type of threat, or to one type of illegal contraband.

Optionally, each of the plurality of different artificial intelligence models are in a different native programming format.

Optionally, each of the application program interfaces is specifically adapted to interface with only one of the plurality of different artificial intelligence models.

Optionally, at least some of the plurality of different artificial intelligence models are in native programming formats that are different from each other.

Optionally, each of the application program interfaces is specifically adapted to interface with only one of the plurality of different artificial intelligence models.

Optionally, at least some of the plurality of different artificial intelligence models are hosted on computing devices physically and logically distinct and separate from the computer system.

Optionally, the computer readable non-transitory medium further comprises programmatic instructions that, when executed, train at least one of the plurality of different artificial intelligence models based on image data acquired in real-time from at least one of the one or more inspection systems.

Optionally, the image data comprises at least one of two-dimensional X-ray images, three-dimensional X-ray images, tomographic X-ray images, multi-energy X-ray images, backscatter X-ray images, or transmission X-ray images.

Optionally, the computer readable non-transitory medium further comprises programmatic instructions that, when executed, receive the image data and the descriptive data associated with the cargo.

Optionally, the computer readable non-transitory medium further comprises programmatic instructions that, when executed, determine a degree of correlation between the descriptive data associated with the image and the data representative of the degree to which the cargo in the image corresponds to the expected type of cargo.

Optionally, the computer readable non-transitory medium further comprises programmatic instructions that, when executed, transmit a value indicative of a degree of correlation to which the cargo in the image data corresponds to the expected type of cargo to the operator workstation.

In some embodiments, the present specification discloses a method of enabling a plurality of different artificial intelligence models to be applied to image data, wherein the image data is acquired from one or more inspection systems and wherein the plurality of executable programmatic instructions, said method comprising: receiving an instruction to apply one of the plurality of different artificial intelligence models to said image data, wherein the image data is at least partially representative of cargo, wherein said cargo has descriptive data associated therewith, and wherein said instruction is received from an operator workstation in data communication with at least one of the one or more inspection systems; acquiring an application program interface specific to said one of the plurality of different artificial intelligence models, wherein the application program interface is configured to enable the one of the plurality of different artificial intelligence models to be applied to the image; causing the one of the plurality of different artificial intelligence models to be applied to the image data using the acquired application program interface; receiving from the one of the plurality of different artificial intelligence models data representative of a degree to which said cargo in the image data corresponds to an expected type of cargo based upon the descriptive data associated with said cargo; and transmitting the data representative of the degree to which the cargo in the image corresponds to the expected type of cargo to the operator workstation and cause said data representative of the degree to which the cargo in the image data corresponds to the expected type of cargo to be displayed on the operator workstation.

Optionally, each of the plurality of different artificial intelligence models are specific to one type of cargo, to one type of threat, or to one type of illegal contraband.

Optionally, each of the plurality of different artificial intelligence models are in a different native programming format.

Optionally, each of the application program interfaces is specifically adapted to interface with only one of the plurality of different artificial intelligence models.

Optionally, at least some of the plurality of different artificial intelligence models are in native programming formats that are different from each other.

Optionally, each of the application program interfaces is specifically adapted to interface with only one of the plurality of different artificial intelligence models.

Optionally, at least some of the plurality of different artificial intelligence models are hosted on computing devices physically and logically distinct and separate from the computer system.

Optionally, the method further comprises training at least one of the plurality of different artificial intelligence models based on image data acquired in real-time from at least one of the one or more inspection systems.

Optionally, the image data comprises at least one of two-dimensional X-ray images, three-dimensional X-ray images, tomographic X-ray images, multi-energy X-ray images, backscatter X-ray images, or transmission X-ray images.

Optionally, the method further comprises receiving the image data and the descriptive data associated with the cargo.

Optionally, the method further comprises determining a degree of correlation between the descriptive data associated with the image and the data representative of the degree to which the cargo in the image corresponds to the expected type of cargo.

Optionally, the method further comprises transmitting a value indicative of a degree of correlation to which the cargo in the image data corresponds to the expected type of cargo to the operator workstation.

The aforementioned and other embodiments of the present specification shall be described in greater depth in the drawings and detailed description provided below.

BRIEF DESCRIPTION OF THE DRAWINGS

The accompanying drawings illustrate various embodiments of systems, methods, and embodiments of various other aspects of the disclosure. Any person with ordinary skills in the art will appreciate that the illustrated element boundaries (e.g. boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another and vice versa. Furthermore, elements may not be drawn to scale. Non-limiting and non-exhaustive descriptions are described with reference to the following drawings. The components in the figures are not necessarily to scale, emphasis instead being placed upon illustrating principles.

FIG. 4 illustrates a graphical user interface (GUI) that an operator may use to order a prediction of cargo contents, according to an embodiment of the present disclosure;

FIG. 5 illustrates a graphical user interface (GUI) which may facilitate an operator to see manifest data of a specific image, according to an embodiment of the present disclosure;

FIG. 7C is a screenshot illustration of an operator audit trail, in accordance with an embodiment of the present specification;

DETAILED DESCRIPTION

Figure 1:
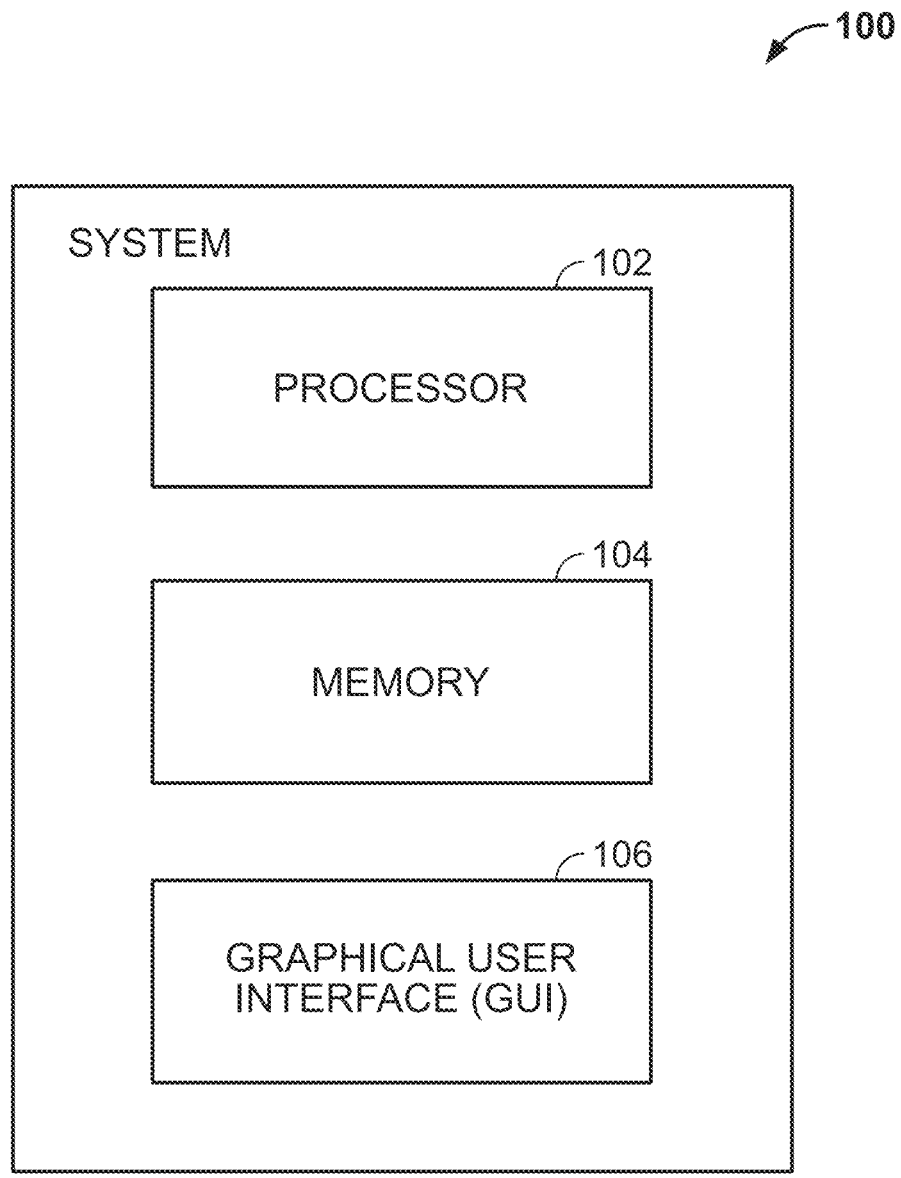
FIG. 1 illustrates a block diagram showing an exemplary system architecture, according to an embodiment of the present disclosure.

The present specification discloses systems and methods for receiving operator instructions, via a graphical user interface, to acquire images from an image cache or database, determine which artificial intelligence (AI) based analytical model to apply, identify a corresponding AI service, optionally hosted by a third party platform that executes the AI service in a predefined native format, and apply an abstracted application program interface specific to that predefined native format in order to enable the AI service to be applied to the acquired images. The AI service may comprise a highly specialized AI algorithm tuned to identify a particular class of permissible goods, such as bananas, tennis balls, computer chips, or any other non-contraband or allowable tradeable product. When the AI service model is applied to the image and an output is generated, i.e. that the submitted image corresponds to a cargo filled with bananas, the operator can manually or automatically compare that to the corresponding manifest to determine if there is a sufficient correlation. If so, the cargo may be authorized to proceed. If not, the cargo may be sequestered for further inspection.

The disclosed systems and methods have several critical benefits. First, they will enable numerous currently proprietary, closed AI models, which have been generated due to the unique commercial trade of a particular location, to be widely shared, even though they may be restricted to very different native programmatic formats. For example, a number of programmatic platforms provide AI models which can be tuned to detect or analyze nearly any input image. In particular, software systems such as OpenCV®, Google Tensor Flow®, and Microsoft ML® offer systems for AI development, object recognition, and classification, each of which represents a different programmatic native format. While possibly satisfactory in systems where the type of cargo is limited and the number of AI models may be small, the different platforms and varied AI service model native formats create substantial challenges if a port wishes to integrate many of them in order to inspect a wide variety of goods.

Second, in certain circumstances, it may be preferred to inspect and clear cargo by determining to what extent the detected cargo conforms to expectations based on the manifest, as opposed to inspect and sequester cargo by determining to what extent threats or contraband is detected in the cargo. Given the substantially larger amount of image data displaying expected or known cargo types as compared to contraband or threats, AI models can be better designed, developed and tuned to identify those expected, permissible, or known cargo types, in numerous different configurations, than the scarcer contraband, which has a far more limited available dataset. In such cases, where the inspected cargo conforms to a predetermined threshold amount of the expected cargo, the cargo may be cleared. For example, if the expected cargo only comprises bananas and the data representative of the inspected cargo indicates that the inspected cargo is nearly 100% (or some lower, yet still acceptable number, such as 98%) bananas, the system would still clear the cargo.

The present specification is directed towards multiple embodiments. The following disclosure is provided in order to enable a person having ordinary skill in the art to practice the invention. Language used in this specification should not be interpreted as a general disavowal of any one specific embodiment or used to limit the claims beyond the meaning of the terms used therein. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

Some embodiments of this disclosure, illustrating all its features, will now be discussed in detail. The words "comprising," "having," "containing," and "including," and other forms thereof, are intended to be equivalent in meaning and be open-ended in that an item or items following any one of these words is not meant to be an exhaustive listing of such item or items, or meant to be limited to only the listed item or items. It should be noted herein that any feature or component described in association with a specific embodiment may be used and implemented with any other embodiment unless clearly indicated otherwise.

It must also be noted that as used herein and in the appended claims, the singular forms "a," "an," and "the" include plural references unless the context dictates otherwise. Although any systems and methods similar or equivalent to those described herein can be used in the practice or testing of embodiments of the present disclosure, the preferred, systems and methods are now described.

Embodiments of the present disclosure will be described more fully hereinafter with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

Exemplary System Architecture

FIG. 1 illustrates a block diagram showing an exemplary system 100 architecture, according to an embodiment. The system 100 may include a processor 102, a memory 104, and a Graphical User Interface (GUI) 106.

In one embodiment, the system 100 may be an inspection system. One of ordinary skill in the art would appreciate that the features described in the present application can operate on any computing platform including, but not limited to: a laptop or tablet computer; personal computer; personal data assistant; cell phone; server; embedded processor; DSP chip or specialized imaging device capable of executing programmatic instructions or code.

It should further be appreciated that the platform provides the functions described in the present application by executing a plurality of programmatic instructions, which are stored in one or more non-volatile memories, using one or more processors and presents and/or receives data through transceivers in data communication with one or more wired or wireless networks.

It should further be appreciated that each computing platform has wireless and wired receivers and transmitters capable of sending and transmitting data, at least one processor capable of processing programmatic instructions, memory capable of storing programmatic instructions, and software comprised of a plurality of programmatic instructions for performing the processes described herein. Additionally, the programmatic code can be compiled (either pre-compiled or compiled "just-in-time") into a single application executing on a single computer, or distributed among several different computers operating locally or remotely to each other.

The processor 102 includes suitable logic, circuitry, and/or interfaces that are operable to execute instructions stored in the memory to perform various functions. The processor 102 may execute an algorithm stored in the memory for performing image inspection systems using third party artificial intelligence platforms. The processor 102 may also be configured to decode and execute any instructions received from one or more other electronic devices or server(s). The processor 102 may include one or more general-purpose processors (e.g., INTEL® or Advanced Micro Devices® (AMD) microprocessors) and/or one or more special-purpose processors (e.g., digital signal processors or Xilinx® System On Chip (SOC) Field Programmable Gate Array (FPGA) processor). The processor 102 may be further configured to execute one or more computer-readable program instructions, such as program instructions to carry out any of the functions described in the description.

Further, the processor 102 may make decisions or determinations, generate frames, packets or messages for transmission, decode received frames or messages for further processing, and other tasks or functions described herein. The processor 102, which may be a baseband processor, for example, may generate messages, packets, frames or other signals for transmission via wireless transceivers. It should be noted that the processor 102 may control the transmission of signals or messages over a wireless network, and may control the reception of signals or messages, etc., via a wireless network (e.g., after being down-converted by a wireless transceiver, for example). The processor 102 may be (or may include), for example, hardware, programmable logic, a programmable processor that executes software or firmware, and/or any combination of these. Further, using other terminology, the processor 102 along with the transceiver may be considered as a wireless transmitter/receiver system, for example.

The memory 104 stores a set of instructions and data. Further, the memory 104 includes one or more instructions that are executable by the processor to perform specific operations. Some of the commonly known memory implementations include, but are not limited to, fixed (hard) drives, magnetic tape, floppy diskettes, optical disks, Compact Disc Read-Only Memories (CD-ROMs), and magneto-optical disks, semiconductor memories, such as ROMs, Random Access Memories (RAMs), Programmable Read-Only Memories (PROMs), Erasable PROMs (EPROMs), Electrically Erasable PROMs (EEPROMs), flash memory, magnetic or optical cards, cloud computing platforms (e.g. Microsoft Azure® and Amazon Web Services®, AWS®), or other types of media/machine-readable medium suitable for storing electronic instructions.

Embodiments of the present disclosure may be provided as a computer program product, which may include a computer-readable medium tangibly embodying thereon instructions, which may be used to program a computer (or other electronic devices) to perform a process. The computer-readable medium may include, but is not limited to, fixed (hard) drives, magnetic tape, floppy diskettes, optical disks, Compact Disc Read-Only Memories (CD-ROMs), and magneto-optical disks, semiconductor memories, such as ROMs, Random Access Memories (RAMs), Programmable Read-Only Memories (PROMs), Erasable PROMs (EPROMs), Electrically Erasable PROMs (EEPROMs), flash memory, magnetic or optical cards, or other types of media/machine-readable medium suitable for storing electronic instructions (e.g., computer programming code, such as software or firmware). Moreover, embodiments of the present disclosure may also be downloaded as one or more computer program products, wherein the program may be transferred from a remote computer to a requesting computer by way of data signals embodied in a carrier wave or other propagation medium via a communication link (e.g., a modem or network connection).

The GUI 106 may be used by an operator to select an image. The operator may then select at least one analytical service module, from a plurality of analytical services modules, and apply the at least one analytical service module to the image for further processing and analyses. As a non-limiting exemplary scenario, in some embodiments, based at least on the selection, one or more AI service models to be applied to the image, may be identified. Further, a data output from the AI service model, may be received. Thereafter, an action may be performed based on the data output. In one case, the data output may include, but is not limited to, at least one of i) clear the cargo, ii) sequester the cargo, or iii) subject the cargo to one or more additional searches or inspections. The GUI 106 may either accept inputs from users or facilitates outputs to the users, or may perform both the actions. In one case, a user may interact with the interface(s) using one or more user-interactive objects and devices. The user-interactive objects and devices may comprise user input buttons, switches, knobs, levers, keys, trackballs, touchpads, cameras, microphones, motion sensors, heat sensors, inertial sensors, touch sensors, or a combination of the above. Further, the interface(s) may either be implemented as a Command Line Interface (CLI), a Graphical User Interface (GUI), a voice interface, or a web-based user-interface. In one embodiment, the GUI 106 may send notifications in a user-friendly or interactive form to the user.

It will be apparent to one skilled in the art that the above-mentioned components of the system 100 have been provided only for illustration purposes. In one embodiment, the system 100 may include an input device, output device etc. as well, without departing from the scope of the disclosure.

Multi-Platform Analytical Services Model

Figure 2A:
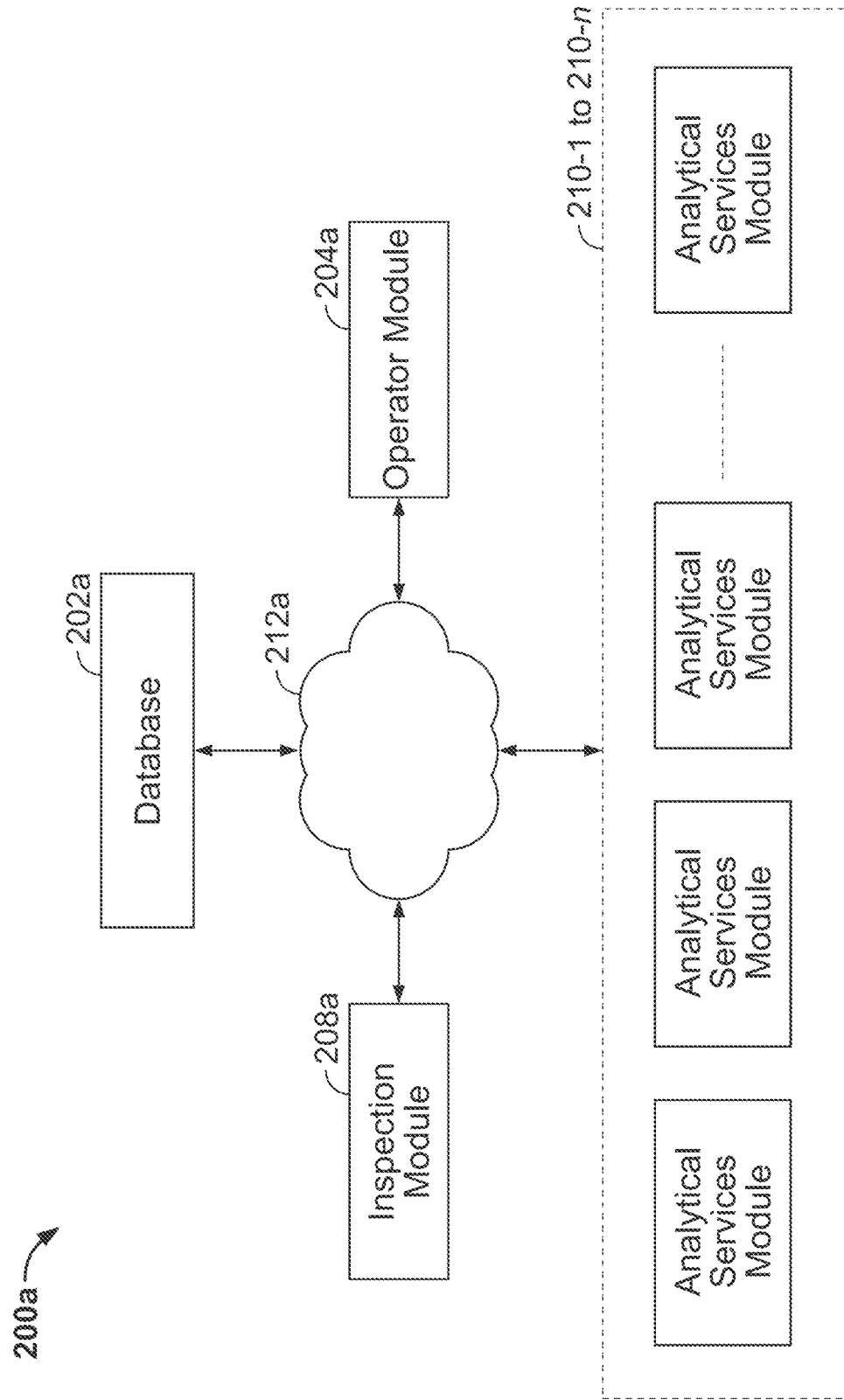
FIG. 2A is a block diagram showing a system configured to implement an analytical service model, in accordance with some embodiments of the present specification.

FIG. 2A illustrates a block diagram of a system 200a configured to implement an analytical services model, in accordance with some embodiments of the present specification. In some embodiments, the system 200a comprises a database 202a, at least one inspection module 208a configured to non-intrusively inspect an object and generate an integrated data packet or structure, at least one operator module 204a and a plurality of analytical services modules 210-1 to 210-n. In some embodiments, the at least one operator module 204a is in data communication with the database 202a, the at least one inspection module 208a, and the plurality of analytical services modules 210-1 to 210-n over a wired and/or wireless network 212a (such as the Internet/Intranet).

In accordance with aspects of the present specification, each of the plurality of analytical services modules 210-1 to 210-n represents programmatic code or instructions (executing on a third party platform, for example) configured to extract one or more data from the integrated data packet or structure for processing and analysis, thereby generating an outcome or result. Stated differently, each of the plurality of analytical services modules 210-1 to 210-n is a fully containerized micro-service that, when called upon and applied to the integrated data packet or structure, performs a specialized and specific function. For example, if the operator determines that the integrated data packet or structure pertains to a specific type of cargo (such as, for example, coffee beans) then the operator may access and apply an analytical service module to the integrated packet or structure where the analytical service module is developed by, as an example, Brazilian customs. In another example, the operator may access and apply another analytical service module (developed by for example, the US customs) specialized in identifying a gun in a handbag with low false alarm rates. In some embodiments, each of the plurality of analytical services modules 210-1 to 210-n may be hosted by a third party platform that executes the associated analytical service in a predefined native format.

In various embodiments, the at least one inspection module 208a is a radiation-based inspection module configured to non-intrusively inspect objects such as, for example, cargo, trucks, containers, passenger vehicles, and baggage and to non-intrusively scan people. In some embodiments, the integrated data packet or structure includes radiation-based scan image data (such as, for example, X-ray scan image data, microwave or gamma/neutron based scanning data) and material characterization data of the object under inspection. In addition, in some embodiments, the integrated data packet or structure includes metadata such as, but not limited to, manifest or shipping data (pre-stored in and acquired from the database 202a); optical image data; video data; biometrics data to identify drivers of cargo vehicles (in case of cargo inspection) and to identify people being scanned (in case of people screening); and/or vehicle identification data such as, for example, RFID (Radio Frequency Identification) data, QR code data and license plate data for land cargo and passenger vehicles or container number Optical Character Recognition (OCR) data for sea cargo containers.

In some embodiments, the integrated data packet or structure is communicated to the at least one operator module 204a in real-time while concurrently being stored in the database 202a. In some embodiments, the integrated data packet or structure is stored in the database 202a for further access and retrieval by the at least one operator module 204a.

In embodiments, the operator module 204a is configured to a) generate at least one graphical user interface (GUI) and receive operator instructions to acquire stored integrated data packet or structure from the database 202a and/or real-time integrated data packet or structure from the inspection module 208a, b) enable an operator of the operator module 204a to determine and select an analytical services module, from the plurality of analytical services modules 210-1 to 210-n, that should be applied to the inspection data, c) apply an abstracted application program interface specific to the predefined native format of the selected analytical services module in order to enable the associated analytical service to be applied to the integrated data packet or structure, d) track and capture the operator's date and time stamped interactions with the information content of the integrated data packet or structure accessed through the at least one GUI, and e) integrate the tracked and captured date and time stamped interactions into the integrated data packet or structure. In some embodiments, the operator's date and time stamped interactions are tracked and captured via the operator's use of human machine interfaces (such as, the at least one GUI, mouse usage, keyboard keystrokes) and using at least a camera to determine what the operator is doing at the operator module 204a based on tracking of the operator's eye movements using the camera.

Figure 8:
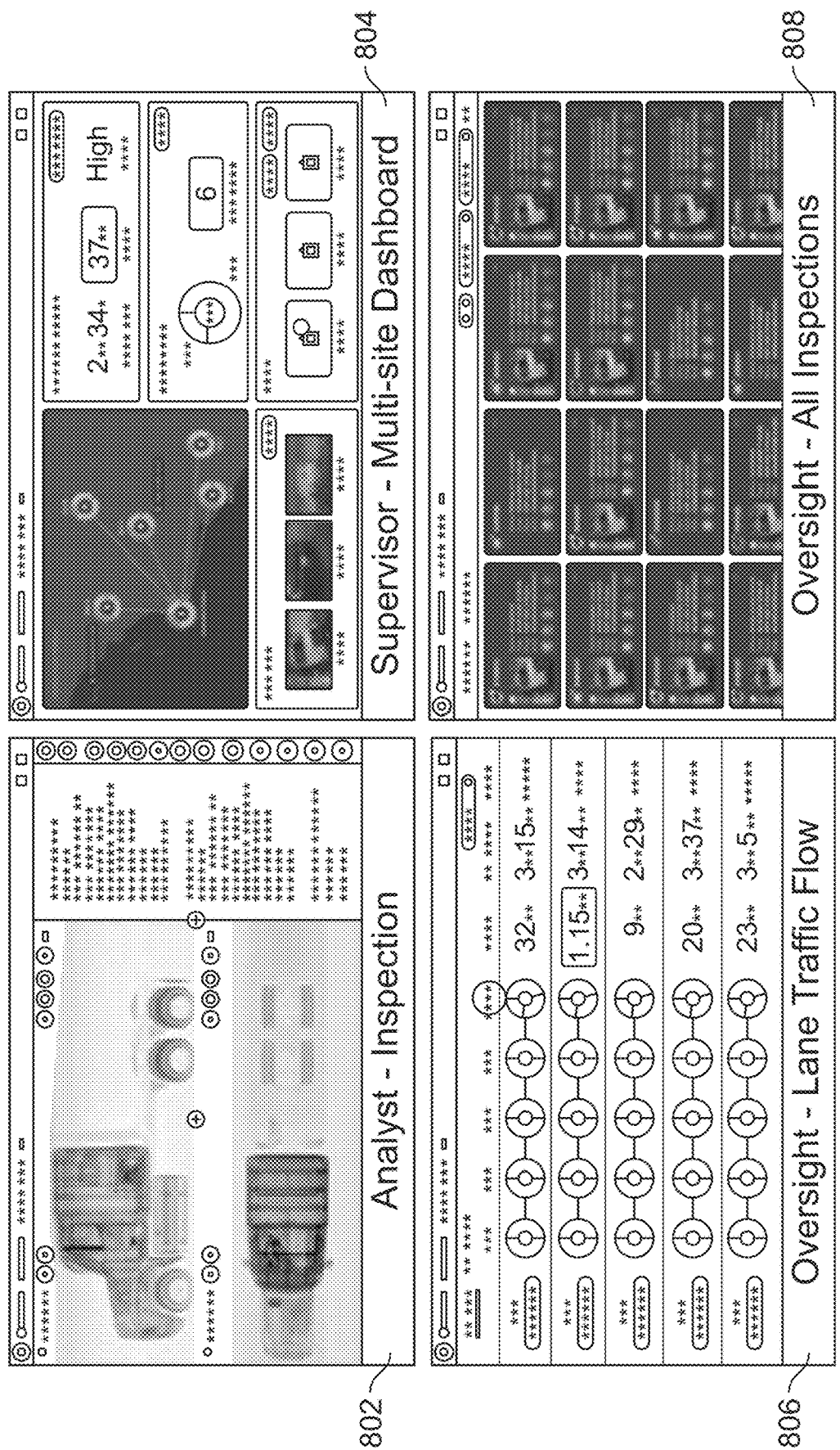
FIG. 8 illustrates first, second, third and fourth GUIs generated by an operator module, in accordance with some embodiments of the present specification.

In accordance with some aspects of the present specification, the operator module 204a generates one or more GUI dashboard tiles that, when formatted to the preferences of the screening entity, extracts from the integrated data packet or structure only that information which is of interest and relevance to the screening entity as well as is in a design, language and layout in which the screening entity is accustomed to view the information. For example, as shown in FIG. 8, GUI 802 is generated displaying scan images of a cargo vehicle at a single inspection site from the perspective of an image analyst as the screening entity. GUI 804 is generated displaying a multi-site dashboard with information from multiple inspection sites from the perspective of a supervisor as the screening entity. GUI 806 is generated displaying lane traffic flow information from the perspective of a traffic oversight inspector as the screening entity. GUI 808 is generated displaying information from all inspection sites if the screening entity is a senior personnel having the advantage of oversight of all entities. Similarly, as another non-limiting example, the layout and design of a first set of GUIs would differ if the corresponding integrated data packet or structure includes information pertaining to land cargo inspection from the layout and design of a second set of GUIs if the corresponding integrated data packet or structure includes information pertaining to sea container inspection, people screening, or baggage screening at airport transit points.

In some embodiments, the system 200a supports a distributed architecture where the at least one operator module 204a, the at least one inspection module 208a, the database 202a and the plurality of analytical services modules 210-1 to 210-n are geographically distributed and remote from each other.

The service-oriented architecture implemented by the system 200a will now be described in the context of cargo inspection as an exemplary use case scenario. However, as discussed earlier, the system 200a is equally applicable to non-intrusively inspect passenger vehicles, baggage, and people screening applications.

Figure 7A:
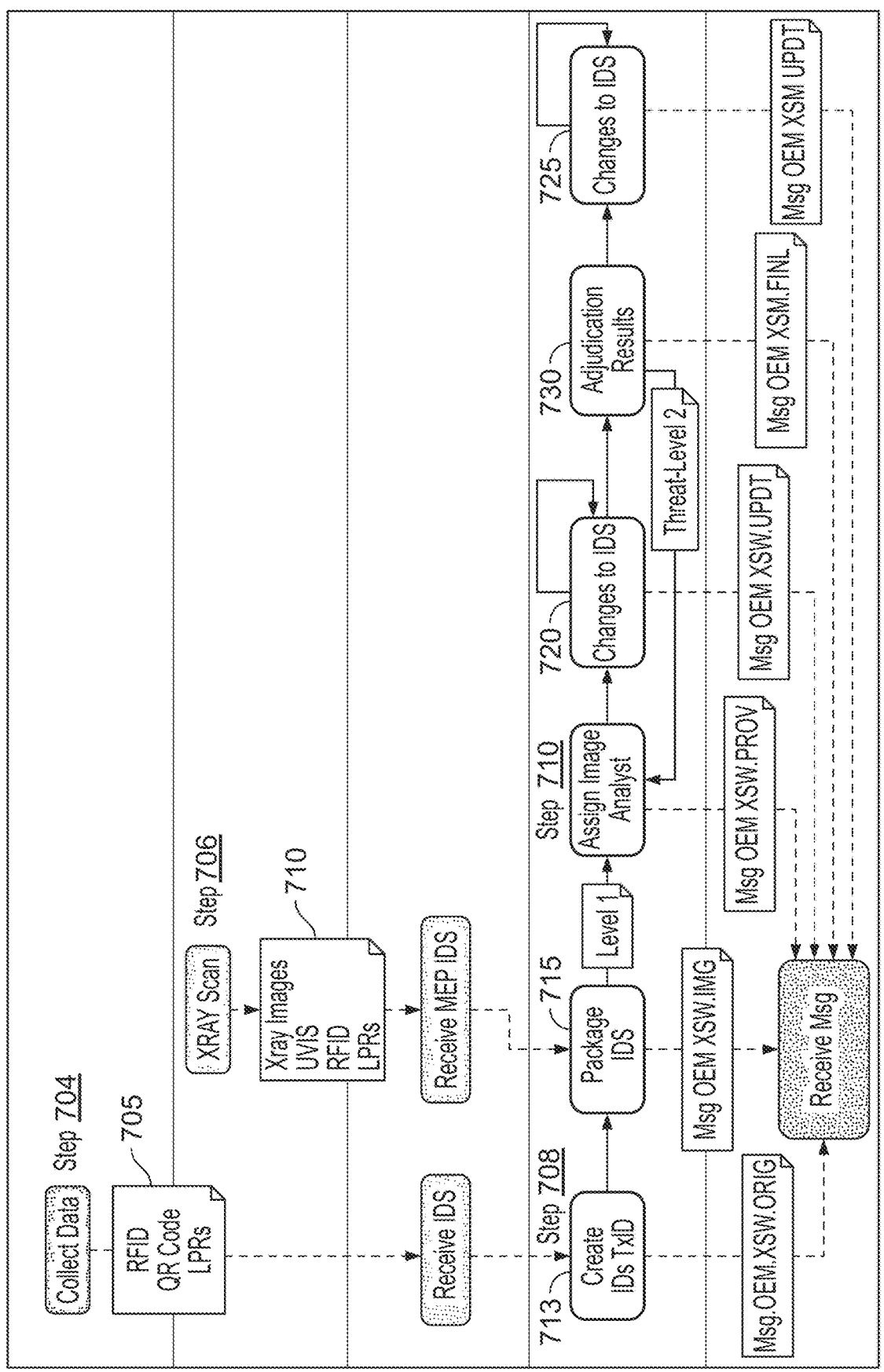
FIG. 7A is a workflow diagram illustrating generating and updating an integrated data packet or structure in the context of cargo inspection, in accordance with some embodiments of the present specification.
Figure 7B:
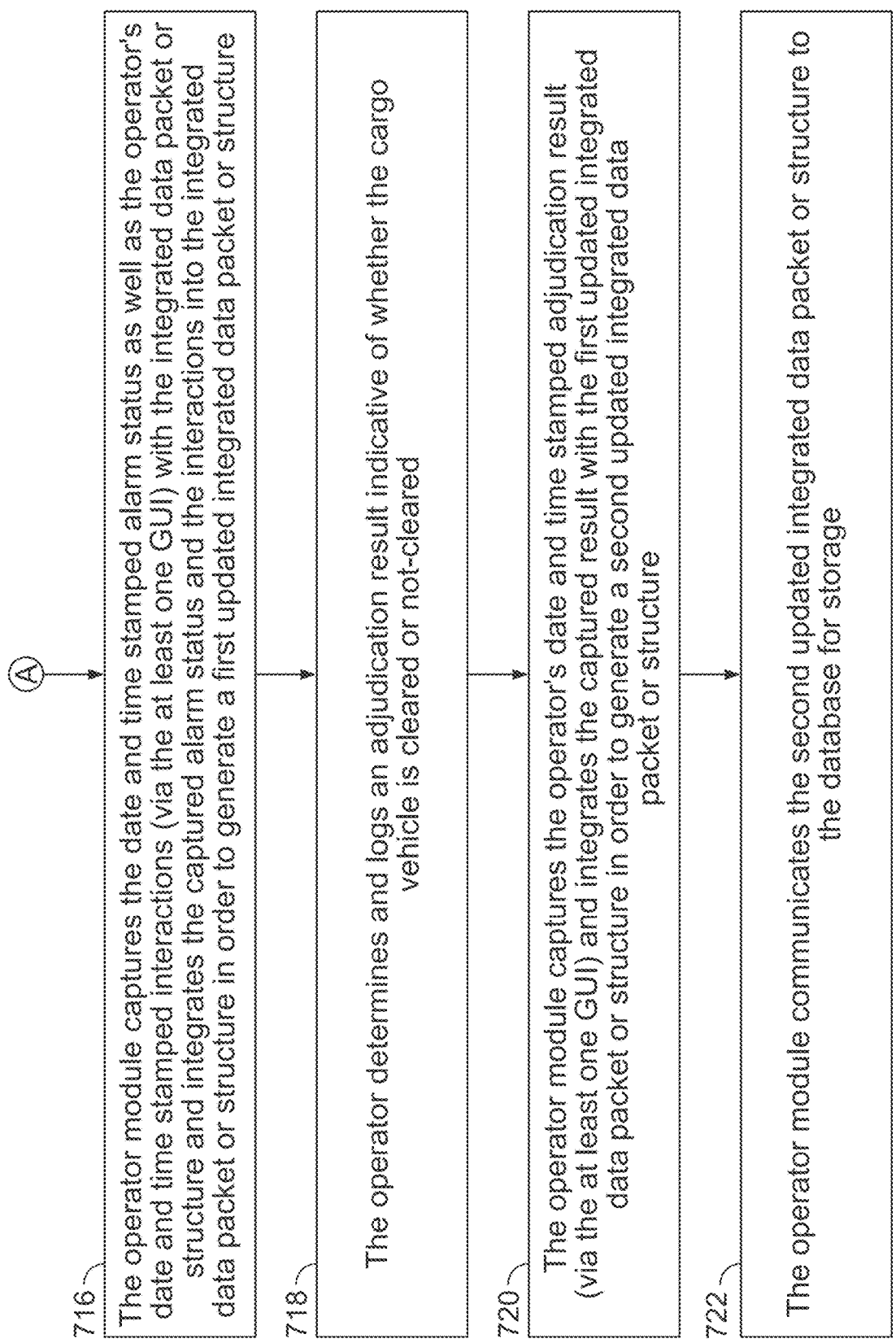
FIG. 7B is a flowchart of a plurality of exemplary steps of a method of generating and updating an integrated data packet or structure, in accordance with some embodiments of the present specification.

FIG. 7A is a workflow diagram illustrating the generation of and updating of an integrated data packet or structure in the context of cargo inspection while FIG. 7B is a flow chart of a plurality of exemplary steps of a method of generating and updating the integrated data packet or structure, in accordance with some embodiments of the present specification.

Referring now to FIGS. 2A, 7A and 7B, at step 702, the cargo vehicle (comprising, for example, a tractor/truck, trailer, or container and cargo) is directed by a traffic control system to move over an entry lane leading to a scanning unit of the inspection module 208a. In some embodiments, the inspection module 208a includes the traffic control system having traffic lights (such as, for example, green, yellow, and red) to indicate to a driver as to when the cargo vehicle must start, wait, or stop with a different color denoting each requirement. In some embodiments, the inspection module 208a includes a scanning unit that is configured as a drive-through, multi-energy X-ray scanning system capable of generating scan image data and material characterization data of the cargo vehicle. In some embodiments, the inspection module 208a further includes an integrated under vehicle back-scatter system (UVBS). In some embodiments, the inspection module 208a further includes a check-in kiosk installed in the entry lane to scan the cargo vehicle for identification related data prior to the cargo vehicle entering the scanning unit, wherein the check-in kiosk is in data communication with the scanning unit.

At step 704, the check-in kiosk of the inspection module 208a acquires first data 705 indicative of an identification of the cargo vehicle. In some embodiments, the first data 705 includes at least one of RFID data, driver presented QR code data, or license plate data. In some embodiments, the first data 705 may further include biometrics data (such as, for example, facial recognition data) of the driver along with optical image and/or video data of the cargo vehicle. In case of sea cargo containers, the first data includes a container number Optical Character Recognition (OCR) data.

In some embodiments, all or a portion of the first data 705 is acquired by the check-in kiosk positioned in the entry lane prior to the cargo vehicle being scanned by the scanning unit of the inspection module 208a. In some embodiments, all or a portion of the first data 705 is acquired by the inspection module 208a upon detection of the cargo vehicle entering the inspection module 208a for scanning. In some embodiments, the first data 705 is acquired both at the check-in kiosk as well as by the inspection module 208a.

At step 706, the scanning unit of the inspection module 208a conducts an X-ray scan of the cargo vehicle (as the cargo vehicle is driven through the inspection module 208a at a predefined average speed) and generates second data 710 indicative of one or more scan image data (including, in some embodiments, under vehicle back scatter scan image data) and material characterization data of the cargo vehicle. In some embodiments, the second data 710 also includes a unique identification number associated with the inspection module 208a (in order to positively identify the scanning unit used to generate the second data 710) and the average speed data of the cargo vehicle during scanning. In some embodiments, the second data 710 may further include all or a portion of the elements constituting the first data 705, thus, all or a portion of the first data 705 may yet again be acquired by the scanning unit as part of the second data 710.

At step 708, the inspection module 208a associates a date and time stamp as well as a unique identification or case record number 713 with the first data 705 and second data 710 to generate an integrated data packet or structure 715.

At step 710, the inspection module 208a communicates the integrated data packet or structure 715 to the at least one operator module 204a and to the database 202a for storage. In some embodiments, the integrated data packet or structure 715 is communicated to the at least one operator module 204a and to the database 202a concurrently and in real-time. In some embodiments, the integrated data packet or structure 715 may be queued until an operator module is available to receive it. In some embodiments, the integrated data packet or structure 715 is communicated to an operator module based on one or more of the following factors: a) availability of an operator module, b) skill, training score, and/or experience level of an operator indicative of an ability of the operator to analyze the integrated data packet or structure 715 and c) type of cargo content. For example, an integrated data packet or structure including easier scan image data may be routed to a less skilled, trained, and/or experienced operator whereas an integrated data packet or structure including harder scan image data may be routed to a more skilled, trained, and/or experienced operator.

At step 712, the operator module 204a generates at least one GUI to enable an operator/analyst to view information included in the integrated data packet or structure 715 for review. In some embodiments, the operator module 204a is configured to access additional data such as, for example, manifest or shipping data (associated with the cargo vehicle) from the database 202a for display in the at least one GUI.

At step 714, the operator determines an alarm status corresponding to the cargo vehicle. In some embodiments, the operator uses a screening program application that automatically analyses at least a portion of the information included in the integrated data packet or structure 715 to indicate to the operator whether an alarm situation exists. In some embodiments, the operator may further manually review at least a portion of the information included in the integrated data packet or structure 715 to further determine if the alarm situation exists.

At step 716, the operator module 204a captures the date and time stamped alarm status (determined at step 714) as well as the operator's date and time stamped interactions (via the at least one GUI) with the integrated data packet or structure 715 and integrates the captured alarm status and the interactions into the integrated data packet or structure 715 in order to generate a first updated integrated data packet or structure 720. In various embodiments, the interactions include one or more of: a) the operator viewing various elements constituting the integrated data packet or structure 715, b) the operator zooming, rotating, and/or annotating (for anomalies) rendered scan image data, c) the operator selecting at least one of the plurality of analytical services modules 210-1 to 210-n to be applied to the integrated data packet or structure 715 in order to determine an adjudication result indicative if the cargo contains suspicious, anomalous, illicit, contraband items and/or if the cargo scan analysis indicates substantial departure from manifest/shipping data, or d) the operator actuating one or more keys of a keyboard or any other elements of the HMI (Human-Machine Interface) associated with the operator module 204a. In some embodiments, the first updated integrated data packet or structure 720 also includes an ID (identification) of the operator.

FIG. 7C illustrates an operator audit trail, in accordance with an embodiment of the present specification. Table 750 is an exemplary list of an operator's audit parameters. Column 752 comprises a plurality of operator parameters such as, but not limited to, at least one of an 'operator id', 'decision', 'decision reason', 'comments', 'scanning time', 'rendered time for inspection', 'decision submitted time', 'image operations log', 'user group', 'image id' and column 754 provides the respective operator entered values corresponding to each parameter listed in column 752.

At step 718, the operator determines and logs an adjudication result 730 indicative of whether the cargo vehicle is cleared or not-cleared. In some embodiments, the adjudication result 730 is determined based on a resultant output generated by at least one of the plurality of analytical services modules 210-1 to 210-n applied to the integrated data packet or structure 715.

At step 720, the operator module 204a captures the operator's date and time stamped adjudication result 730 (via the at least one GUI) and integrates the captured result 730 with the first updated integrated data packet or structure 720 in order to generate a second updated integrated data packet or structure 725.

At step 722, the operator module 204a communicates the second updated integrated data packet or structure 725 to the database 202a for storage.

Unified File Format

In embodiments, the present specification provides systems and methods enabling users to effectively and efficiently transfer image files and metadata from Non-Intrusive Inspection (NII) systems to third party applications, such as a Common Viewer System (CVS) or Integration Platform.

An NII system creates Image Data Sets (IDS) comprising image files, metadata files, and other files (collectively referred to as "scan artifacts"). In embodiments, as Image Data Sets (IDS) are created (by the NII or X-ray scanner), they are transferred to a central repository for accessing and processing by third party applications. Network connectivity between the X-ray scanner and the central repository may be established with a wired or wireless network link. In an embodiment, the central repository comprises a network-attached storage (NAS) appliance that appears as a file-server within a third party network. In various embodiments, NAS devices may be provided by an NII supplier or the customer, and may be connected via hard wired or wireless Ethernet connection. In another embodiment, the NAS may be a shared drive on a networked computer.

If multiple scanners are assigned to a central repository, each scanner is assigned a storage location within the central repository. In an embodiment, the storage location comprises an NTFS compliant network share. Utilizing the name (or IP address) of the file-server, along with a username/password pair, software residing within the X-ray scanner ("scanner software") mounts/dismounts its assigned network-share as needed. When mounted, the network-share becomes a removable drive (also referred to as: "archive disk") within the operating environment that supports the scanner software. During normal operation, the scanner software is responsible for maintaining a network link to the archive disk. In the event of a lost network connection to the central repository, the scanner software attempts to re-establish access to the archive disk as soon as the network connection to the central repository is re-established.

Figure 9:
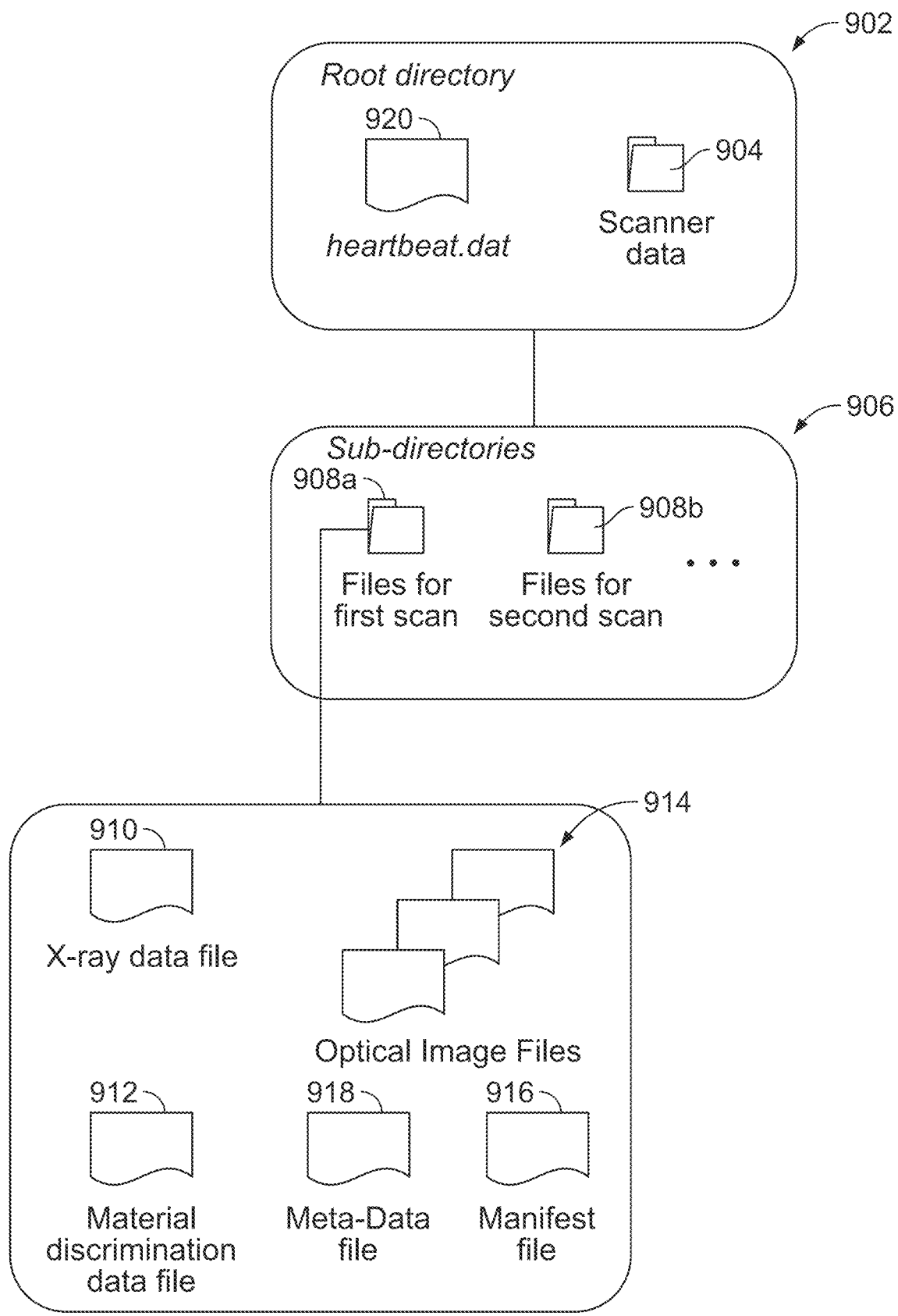
FIG. 9 is a block diagram illustrating a scanner-data directory structure, in accordance with an embodiment of the present specification.

In embodiments, the scan artifacts are stored on the archive disk in directories. FIG. 9 is a block diagram illustrating a scanner data directory structure, in accordance with an embodiment of the present specification. The root of the archive disk holds a single directory, referred to as the scanner data directory 902 and comprises scan data 904. The data files are organized in subdirectories 906 with each subdirectory containing files 908a, 908b . . . 908n with the scan-artifacts associated with a single scan. There are five types of scan-artifacts associated with each conveyance stored in separate files: X-ray data files 910 comprising a single transmission scan image; material discrimination data file 912 comprising a single material discrimination overlay file; optical images comprising one or more files 914 in jpeg format; a manifest comprising a single file 916 in TIF format; and meta-data files 918 in XML, format.

The network-share assigned to a scanner serves as a root-directory where image data sets are organized and archived. When the network-share is initially accessed by the software, it is completely empty. On first access, the scanner software initializes the scanner-data directory 902 by creating a single file named as heartbeat.dat 920 and a single subdirectory named Scanner-Data 904 within the scanner-data directory 902. The file heartbeat.dat 920 comprises data that allows applications to determine if the NII system assigned to the network-share is present/active. In an embodiment, the NII system software overwrites the heartbeat.dat file 920 once per minute. The file heartbeat.dat 920 contains a time-stamp that indicates when the file was written to the network-share. In an embodiment, the time-stamp comprises ASCII numeric characters with the format defined by the ISO 8601 standard including the Universal Coordinated Time (UTC) offset. This time-stamp shows the local time with an offset relative to UTC. The usage of the UTC offset avoids potential problems that can occur with local time when the clocks are changed for daylight savings. In an embodiment, the time-stamp uses an ISO 8601 format that comprises minus sign separator characters in the date but does not include separator colon characters in the time. In some embodiments, the colons have been omitted since the same time-stamp format is also used in the names of files and folders within the network-share and colon characters are not valid with NTFS which is used by the NAS.

In embodiments, in addition to the time-stamp, the file heartbeat.dat 920 contains two optional fields, each beginning with a semi-colon, wherein the first optional field, if present, announces an offline event and the second optional field, included only if the first optional field is present, specifies an expected duration of the offline event in minutes. Since the second optional field is included only if the first optional field is included, if in any case it is not included, the offline event is assumed to be indeterminate. The first optional field may comprise 0-32 characters specifying the reason for the offline event. In embodiments, the last character of the heartbeat.dat file 920 is an ASCII carriage return with hexadecimal value 0x0D represented below as <cr>. As an example, the following characters may be used:

yyyy-MM-dd'T'HHmmsszz[;<optional offline notice>][;<optional offline duration>]<cr>

Exemplary formats of the time-stamp are described below as non-limiting examples in Table 1:

TABLE 1

Heartbeat.dat File Examples

| Description | Example |
| --- | --- |
| Periodic heartbeat.dat during operation. The time zone is five hours later (after) UTC. This is typical for the U.S. Eastern time zone. | 2017-01-31T021603-05<cr> |
| Heartbeat.dat for planned offline event without any reason. | 2017-01-31T021603-05; <cr> |
| Heartbeat.dat for planned offline event with reason but without expected duration. | 2017-01-31T021603-05; Scanner Maintenance<cr> |
| Heartbeat.dat for planned offline event withreason and with expected duration. | 2017-01-31T021603-05; Scanner Maintenance; 30<cr> |

In an embodiment, in order to avoid processing data before it has been completely written, the directories for the scan data are created with the following sequence:
1. A directory is created with a temporary name that is ignored by receiving applications.
2. All the data files for a scan are written into the directory.
3. The directory is re-named to a final name so that it is recognized by the receiving applications.

In embodiments, the temporary name may consist of any valid directory name as long as it does not begin with the three characters "CI_". The final name for the directory comprises the three characters "CI_" followed by a time-stamp with the same ISO 6801 format as used for the heartbeat.dat file 920. Table 2 specifies the directory naming formats:

TABLE 2

DIRECTORY NAMING FORMATS

| Time-stamp Generation Condition | Directory Name Format and Example |
| --- | --- |
| Format for Image Data Sets which are always generated with at least 1 second separation. Milliseconds are not required in the time-stamp. | CI_yyyy-MM-dd'T'HHmmsszz CI_2017-01-31T021603-05 |

In embodiments, each IDS has five types of artifacts included as files in an NAS folder for that particular IDS. The file contents are described in Table 3 below. Each of the following XML metadata files are only present exactly once, with the name specified, in the NAS folder for a particular IDS. Only XML metadata files have naming requirements, and the names of the other files are unrestricted to allow usage of file names already established with conventions specific to the scanner software that is providing the data. The names of the other files appear in an appropriate metadata file to be used by the NII system (for example, license plate OCR images in ocr.xml).

TABLE 3

FILE ARTIFACTS

| File Artifact | Extension | Description |
| --- | --- | --- |
| optical | .TIF or .JPEG | One or more optical image data files of the conveyance. The intended use is to provide an image of the container-id. |
| X-ray imagedata | .TIF | A single image data file. The X-ray image has been corrected for speed. File format: TIFF file (single image file) Grayscale linear data 16 bits depth (0 meaning no signal - 65535 max value), Lossless compressed or uncompressed File name: xray<index>.tif <index> incremental digital index to ensureuniqueness of the filename in its directory. Examples: xray1.tif xray985.tif |
| X-ray thumbnail image | .TIF | A thumbnail of the X-ray. This must be listed in the xray.xml file as a thumbnail. This should be much smaller than the original X-ray to avoid slowing down software using it as a thumbnail. |
| High energy material discrimination (HEMD) | .PNG | A single image data file representing the results of the HEMD. File format: PNG file Palletized - 8 bits per pixel referring to a color in the palette. |

TABLE 3-continued

FILE ARTIFACTS

| File Artifact | Extension | Description |
|---|---|---|
| | | One single file is used to store HEMD result. There is one or zero HEMD file for each x-ray intensity image. No X-ray intensity data is stored in this file. HEMD files shall be the same dimension and orientation as the X-ray intensity data. One single file is used to store HEMD result. There is one or zero HEMD file for each x-ray intensity image. No X-ray intensity data is stored in this file. HEMD files shall be the same dimension and orientation as the X-ray intensity data. Lower values are for organic materials. Higher values are for minerals, the highest of which include steel. The precise range is implementation-defined. Utilize the palette to control display to the user. |
| manifest | .TIF | Optional - present only if manifest has been scanned into the system. A single file with the container's manifest in either TIFF image format; The file name must be "manifest" |
| metadata | .XML | A single file containing information associated with the conveyance. The format and content are described in the following section. The file name should be "metadata.xml" and the extension is not case-sensitive. |
| ocr | .XML | Optional - present if OCR data is recorded (such as for license plate). The format and content are described in the following section. The file name should be "ocr.xml" and the extension is not case-sensitive. |
| rfid | .XML | Optional - present if RFID data is recorded as per the "Memory Bank 3 RFID Encoding" specification. The formatand content are described in the following section. The filename should be "rfid.xml" and the extension is not case- sensitive. |
| uvis | .XML | Optional - present if underside image is recorded. The format and content is described in the following section. The file name should be "uvis.xml" and the extension is not case-sensitive. |
| xray | .XML | Optional - present if an XRAY is taken as part of the inspection. The format and content is described in the following section. The file name should be "xray.xml" and the extension is not case-sensitive. |
| history | .XML | Optional - present if an Operator has modified part of the inspection before being sent to the ingestion service. The file should be named "history.xml" and the extension is not case-sensitive. |
| qr | .XML | Optional - present if a QR code has been scanned as a part of the inspection. The format is described in the following section. The file name should be "qr.xml" and the extension is not case-sensitive. |

In embodiments, the meta-data is stored in an XML file. This information is either entered manually by an operator of the scanning system or automatically generated by a sensor (eg. license plate provided by OCR). The meta-data content is described in Table 4 below:

TABLE 4

META-DATA ARTIFACTS

| File | Data Tag | Required | Description |
|---|---|---|---|
| ScanTime | metadata | required | This should be the same time-stamp that is used to generate folder and file names. If the folder and file names specify milliseconds this time-stamp should also specify milliseconds. <yyyy>-<MM>-<dd>T<HH><mm><ss>.<FFF><zz> y—year M—month d—day H—hour m—minute |

TABLE 4-continued

META-DATA ARTIFACTS

| File | Data Tag | Required | Description |
|---|---|---|---|
| | | | s—second |
| | | | F—fractional/milliseconds |
| | | | z—time zone specifier (literal Z character for UTC or +00) |
| ScannerCaseId | metadata | required | Unique identifier of the inspection data assigned by the scanning system. |
| ScannerId | metadata | required | Unique identifier of the X-Ray scanning system. |
| ScannerMake | metadata | required | Manufacturer of the X-Ray scanner. |
| ScannerModel | metadata | required | Model of the X-Ray scanner. |
| ScannerSerial | metadata | required | Serial number of the X-Ray scanner. |
| SequenceNumber | metadata | required | Sequence number of the inspection. This is a number that increments sequentially for a given lane. The first two digits are a zero padded lane number, and must be unique to the lane at the site. The last 6 digits mustbe the incrementing sequence number for that scanner. An example is 01000023. The lane is lane 1 (01) and the sequence is 23 (000023). |
| SiteLocation | metadata | required | A description of the location. For instance: "Lane 1 Brownsville, TX" |
| Speed | metadata | required | Speed of the conveyance relative to the X-Ray scanner. |
| Energy | metadata | required | Energy of the X-Ray source in units of Electron Volts. |
| Dose Rate | metadata | required | Dose rate applied to the conveyance in units of Rads per minute. |
| Type | ocr | required | The type of OCR data captured. "LicensePlate" must be usedfor license plate data for it to be handled correctly. Other data need only have some other type specified. |
| IdRead | ocr | required | Contains the OCR data that was read in string form |
| Location | ocr | required | The side of the truck it came from (e.g. "Front", "Back", "Right", etc.) |
| Confidence | ocr | required | The confidence level of the reading. Must be a number from 0-100 inclusive, with higher indicating greater confidence. |
| Index | ocr | required | For each image this indicates its position in the display order. This is used to ensure that sequential photos show up in the order they were taken for convenience. You cannot skip numbers. It must start at 1 and include every number up to and including some integer N where N is the number of OCR images. |
| OcrImage | ocr | required | The filename of the corresponding OCR image. |
| IsPreferedPhoto | ocr | required | This can be "True" or "False". Exactly one OCR image per "Location" must be "True", and all else should be "False". Forinstance, if there is a "Back" and a "Front", one photo from each must be set to "True", and all else to "False". |
| RfidTag | rfid | required | Contains the unique identifier of the RFID tag |
| RfidEncoding | rfid | required | Contains the stored data in the RFID tag |
| CameraImage | uvis | required | The primary image of the vehicle underside |
| ThumbnailImage | uvis | required | The thumbnail image of the vehicle underside |
| NoiseMarginFactor | xray | optional | If known, this is proportional to the noise in the image and isused in the viewer for filtering purposes |
| MaxRescaleFactor | xray | optional | Controls the maximum amount that the image is allowed to be scaled on the viewer (can't zoom in beyond this point) |
| Type | xray | required | Must be one of "HighEnergy", "MaterialDiscrimination", or"Thumbnail". |
| Name | Xray | required | The filename of the image specified. |

The 'NoiseMarginFactor', and 'MaxRescaleFactor' metadata items act as the upper and lower contrast bound in the UI. The meta-data is stored in XML files and an exemplary XSD for these files is summarized below in Table 5:

TABLE 5

| | XSD for Meta-Data XML Files |
|---|---|
| XSD of metadata.xml | `<xs:schema attributeFormDefault="unqualified" elementFormDefault="qualified" xmlns:xs="http://www.w3.org/2001/XMLSchema">`<br>`<xs:element name="Metadata">`<br>`<xs:complexType>`<br>`<xs:sequence>`<br>`<xs:element type="xs:dateTime" name="ScanTime"/>`<br>`<xs:element type="xs:string" name="ScannerCaseId"/>`<br>`<xs:element type="xs:string" name="ScannerId"/>`<br>`<xs:element type="xs:string" name="ScannerMake"/>`<br>`<xs:element type="xs:string" name="ScannerModel"/>` |

TABLE 5-continued

XSD for Meta-Data XML Files

```
                        <xs:element type="xs:string" name="ScannerSerial"/>
                        <xs:element type="xs:string" name="SequenceNumber"/>
                        <xs:element type="xs:string" name="SiteLocation"/>
                        <xs:element type="xs:string" name="Speed"/>
                        <xs:element type="xs:string" name="Energy"/>
                        <xs:element type="xs:string" name="DoseRate"/>
                    </xs:sequence>
                </xs:complexType>
            </xs:element>
        </xs:schema>
```

XSD of ocr.xml
```
        <xs:schema attributeFormDefault="unqualified"
            elementFormDefault="qualified"
            xmlns:xs="http://www.w3.org/2001/XMLSchema">
            <xs:element name="Ocr">
                <xs:complexType>
                    <xs:sequence>
                        <xs:element name="Image" maxOccurs="unbounded"
                            minOccurs="0">
                            <xs:complexType>
                                <xs:sequence>
                                    <xs:element type="xs:string" name="IdRead"/>
                                    <xs:element type="xs:string" name="Origin"/>
                                    <xs:element type="xs:string" name="Location"/>
                                    <xs:element type="xs:byte" name="Confidence"/>
                                    <xs:element type="xs:byte" name="Index"/>
                                    <xs:element type="xs:string" name="OcrImage"/>
                                    <xs:element type="xs:string" name="IsPreferedPhoto"/>
                                </xs:sequence>
                                <xs:attribute type="xs:string" name="Type"
                                    use="required"/>
                            </xs:complexType>
                        </xs:element>
                    </xs:sequence>
                </xs:complexType>
            </xs:element>
        </xs:schema>
```

XSD of rfid.xml
```
        <xs:schema attributeFormDefault="unqualified"
            elementFormDefault="qualified"
            xmlns:xs="http://www.w3.org/2001/XMLSchema">
            <xs:element name="Rfid">
                <xs:complexType>
                    <xs:sequence>
                        <xs:element type="xs:string" name="RfidTag"/>
                        <xs:element type="xs:string" name="RfidEncoding"/>
                    </xs:sequence>
                </xs:complexType>
            </xs:element>
        </xs:schema>
```

XSD of uvis.xml
```
        <xs:schema attributeFormDefault="unqualified"
            elementFormDefault="qualified"
            xmlns:xs="http://www.w3.org/2001/XMLSchema">
            <xs:element name="Uvis">
                <xs:complexType>
                    <xs:sequence>
                        <xs:element type="xs:string" name="CameraImage"/>
                        <xs:element type="xs:string" name="ThumbnailImage"/>
                    </xs:sequence>
                </xs:complexType>
            </xs:element>
        </xs:schema>
```

XSD of xray.xml
```
        <xs:schema attributeFormDefault="unqualified"
            elementFormDefault="qualified"
            xmlns:xs="http://www.w3.org/2001/XMLSchema">
            <xs:element name="XRay">
                <xs:complexType>
                    <xs:sequence>
                        <xs:element type="xs:string" name="NoiseMarginFactor"/>
                        <xs:element type="xs:string" name="MaxRescaleValue"/>
                        <xs:element name="Image" maxOccurs="unbounded"
                            minOccurs="0">
                            <xs:complexType>
                                <xs:sequence>
                                    <xs:element type="xs:string" name="Name"/>
                                </xs:sequence>
                                <xs:attribute type="xs:string" name="Type"
                                    use="required"/>
                            </xs:complexType>
                        </xs:element>
```

TABLE 5-continued

XSD for Meta-Data XML Files

|  |  |
|---|---|
|  | </xs:sequence><br></xs:complexType><br></xs:element><br></xs:schema> |
| XSD of history.xml | <xs:schema attributeFormDefault="unqualified"<br>elementFormDefault="qualified"<br>xmlns:xs="http://www.w3.org/2001/XMLSchema"><br>  <xs:element name="History"><br>    <xs:complexType><br>      <xs:equence><br>        <xs:element type="xs:string" name="InitialOperator"/><br>        <xs:element name="HistoryEntry" maxOccurs="unbounded"<br>        minOccurs="0"><br>          <xs:complexType><br>            <xs:sequence><br>              <xs:element type="xs:string" name="User"/><br>              <xs:element type="xs:string"<br>              name="ModificationType"/><br>              <xs:element type="xs:string" name="From"<br>              minOccurs="0"/><br>              <xs:element type="xs:string" name="To"/><br>              <xs:element type="xs:dateTime" name="TimeStamp"/><br>              <xs:element type="xs:string" name="Comment"<br>              minOccurs="0"/><br>            </xs:sequence><br>          </xs:complexType><br>        </xs:element><br>      </xs:sequence><br>    </xs:complexType><br>  </xs:element><br></xs:schema> |
| XSD of qr.xml | <xs:schema attributeFormDefault="unqualified"<br>elementFormDefault="qualified"<br>xmlns:xs="http://www.w3.org/2001/XMLSchema"><br>  <xs:element name="QR"><br>    <xs:complexType><br>      <xs:sequence><br>        <xs:element name="info"><br>          <xs:complexType><br>            <xs:sequence><br>              <xs:element type="xs:dateTime" name="created"<br>              minOccurs="0"/><br>              <xs:element type="xs:string" name="description"<br>              minOccurs="0"/><br>            </xs:sequence><br>          </xs:complexType><br>        </xs:element><br>        <xs:element name="face"><br>          <xs:complexType><br>            <xs:sequence><br>              <xs:element type="xs:int" name="processingTime"<br>              minOccurs="0"/><br>              <xs:element type="xs:string" name="imageb64"<br>              minOccurs="0"/><br>              <xs:element type="xs:int" name="faceWidth"<br>              minOccurs="0"/><br>              <xs:element type="xs:int" name="faceHeight"<br>              minOccurs="0"/><br>              <xs:element type="xs:int" name="faceScore"<br>              minOccurs="0"/><br>              <xs:element type="xs:int" name="faceIOD"<br>              minOccurs="0"/><br>            </xs:sequence><br>          </xs:complexType><br>        </xs:element><br>        <xs:element name="code"><br>          <xs:complexType><br>            <xs:sequence><br>              <xs:element type="xs:int" name="processingTime"<br>              minOccurs="0"/><br>              <xs:element type="xs:string" name="imageb64"<br>              minOccurs="0"/><br>              <xs:element type="xs:string" name="decodedQR"<br>              minOccurs="1"/><br>            </xs:sequence><br>          </xs:complexType><br>        </xs:element><br>      </xs:sequence> |

TABLE 5-continued

XSD for Meta-Data XML Files

```
        </xs:complexType>
      </xs:element>
</xs:schema>
```

Figure 10:
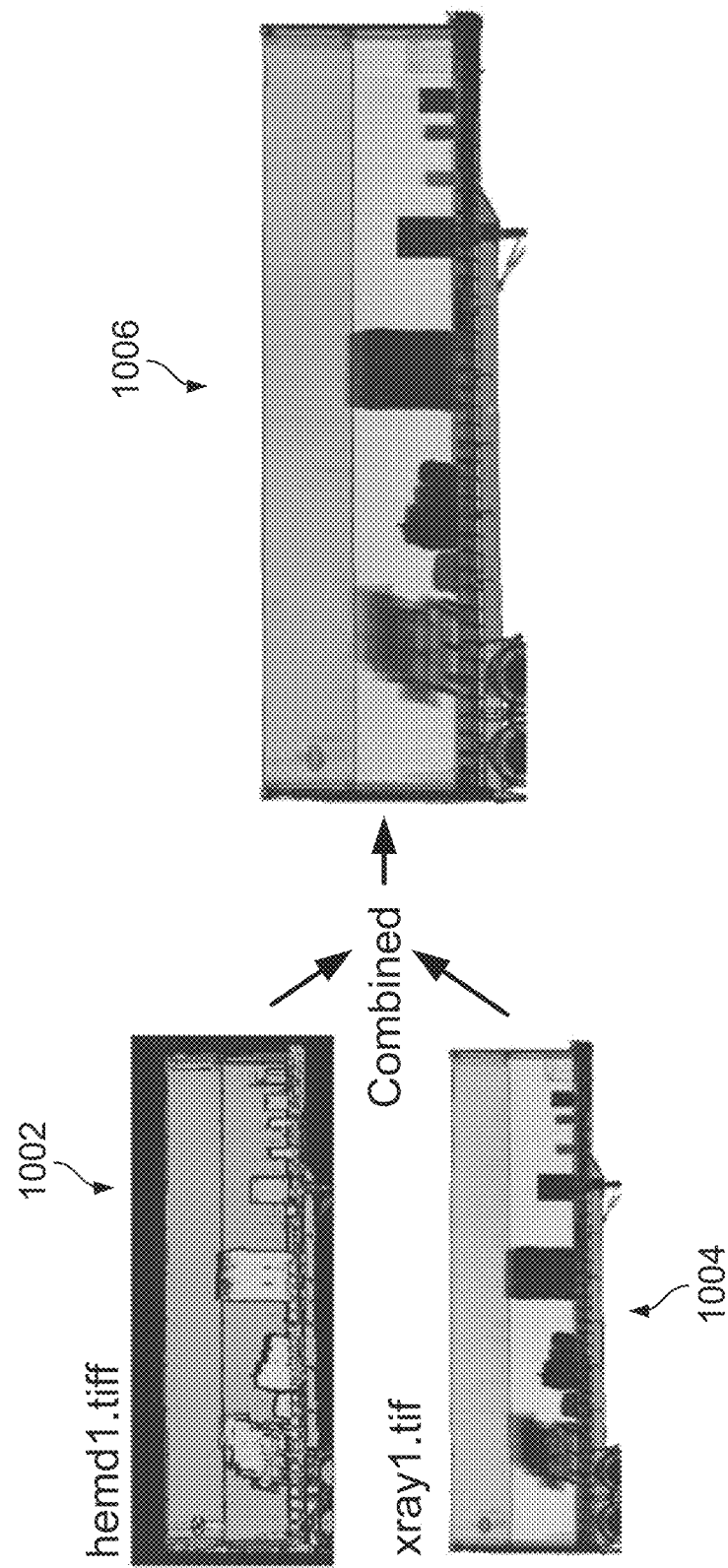
FIG. 10 illustrates an HMED image overlaid on an X-ray image to produce a colorized image, in accordance with an embodiment of the present specification.

In an embodiment, a fixed Z range information may be used to display only a sub-part of the Z values (material stripping) for obtaining high energy material discrimination data (HMED). This can be easily achieved by manipulating the HEMD palette to replace ranges that are not to be colored with grey values i.e. (128,128,128) values. The colors in the palette are stored as RGB (8 bits per component). The size of the palette is 256 colors and 8 bits per pixel. FIG. 10 illustrates an HMED image overlaid on an X-ray image to produce a colorized image, in accordance with an embodiment of the present specification. As shown in the figure, an HEMD image 1002 is used as a transparent overlay of an X-ray image 1004, to produce a colorized image 1006. In an embodiment, the recommended method of combining color with intensity is to convert to HSL (Hue Saturation Lightness) colorspace and then replace the lightness value with the intensity value from the X-ray image, as tabulated in Table 6 below:

TABLE 6

Per Pixel:

| | |
|---|---|
| h, s, l = rgbtohsl(original_z_colour) | Extract color from HEMD |
| l = intensity_from_xray | Assign lightness to X-ray intensity |
| output_colour = hsltorgb(h, s, l) | Combine HEMD color with X-ray Intensity |

AI Service Model

Figure 2B:
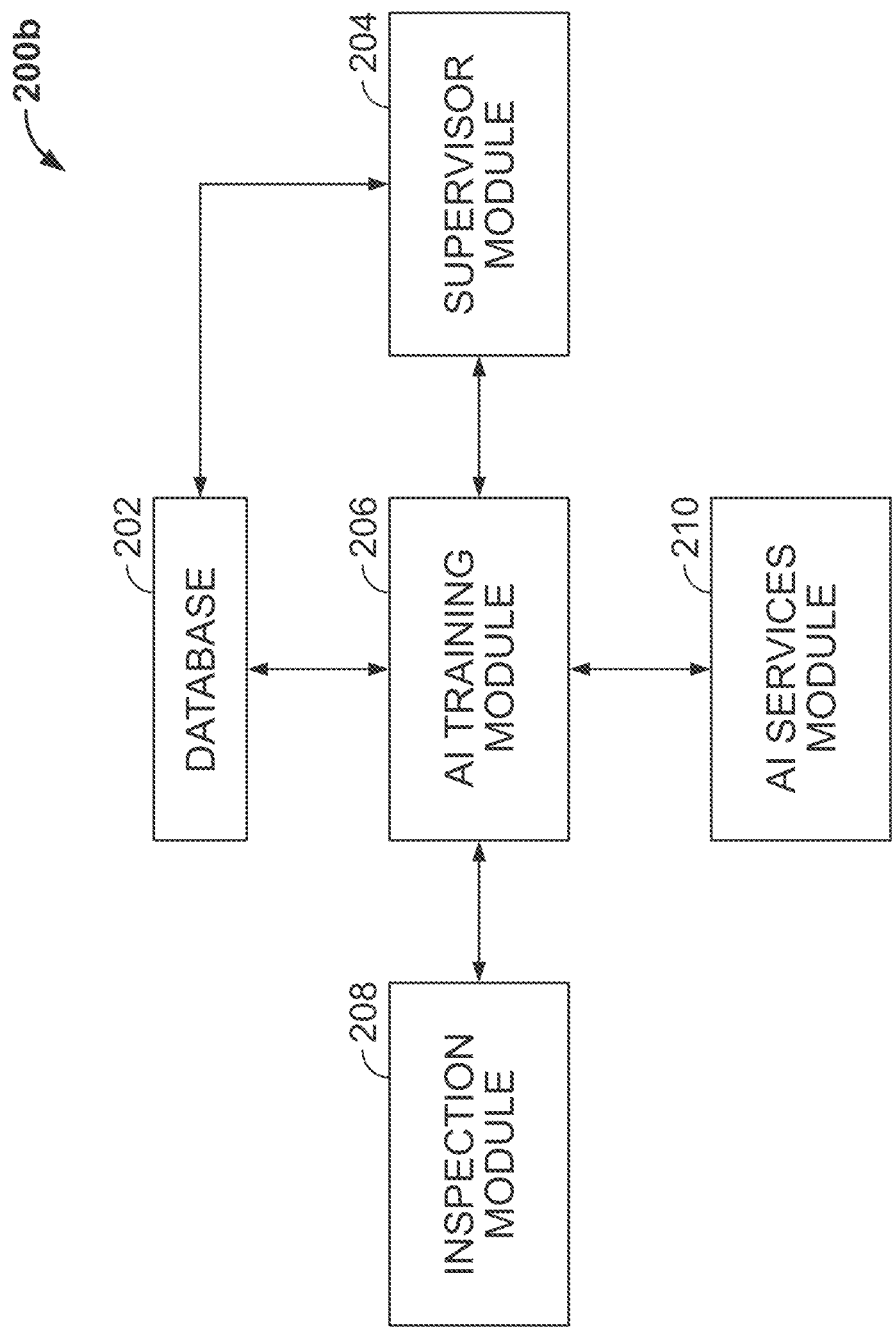
FIG. 2B illustrates a block diagram showing a system for creating an artificial intelligence (AI) service model, according to an embodiment of the present disclosure.

FIG. 2B illustrates a block diagram showing a system 200b for creating an AI service model. The system 200 may comprise an image database 202, a supervisor module 204, an Artificial Intelligence (AI) training module 206, an inspection module 208 which may generate and deliver images in real-time, and an AI services module 210, which can then be implemented in the multi-platform AI module system described below. It can be noted that the AI training module 206 may be communicatively coupled to the supervisor module 204.

The image database 202 may be configured to store images that are received from a plurality of different sources. The image data may comprise, but not limited to, two-dimensional X-ray images, three dimensional X-ray images, single or multi-energy X-ray images, microwave radiation data, or any other image format. Further, the image database 202 may be communicatively coupled to the supervisor module 204 that is configured to send and/or receive data from/to the image database 202. Further, the supervisor module 204 may be used to tag the image data with one or more descriptors. Successively, the supervisor module 204 may generate or identify training data based on the tagged data in real-time. In one embodiment, the supervisor module 204 may be operated by a supervisor, without departing from the scope of the invention.

Based on the training data, the AI training module 206 may create an AI services model 210, for image inspection systems. Further, the AI training module 206 may train the AI services model 210, based on the identified training data. In one embodiment, the AI training module 206 may use the images from the image database 202, as tagged and described via the supervisor module 204, to generate a neural network or AI module that is made available to the overall system architecture, as an AI services module 210. In one embodiment, the AI training module 206 may apply one of numerous different AI platforms or algorithmic approaches to generate an AI module (or neural network) having a weighted set of nodes which, when applied to an image, may determine whether the contents of the image comport with the one or more descriptors, i.e. if the images indicate that the cargo is 99% banana.

In one embodiment, the inspection module 208 may scan the cargo container and may be communicatively coupled to the AI training module 206 to use real-time cargo data in the training of the AI services module 210. Further, the real-time cargo data may be used to determine the contents of the cargo. In one case, the inspection module 208 may be an X-ray scanning device configured to capture one or more X-ray images of the cargo container. In another case, the inspection module 208 may be a scanning device based on other forms of radiation, including microwave or gamma/neutron.

Multi-Platform AI Services Architecture

Figure 3A:
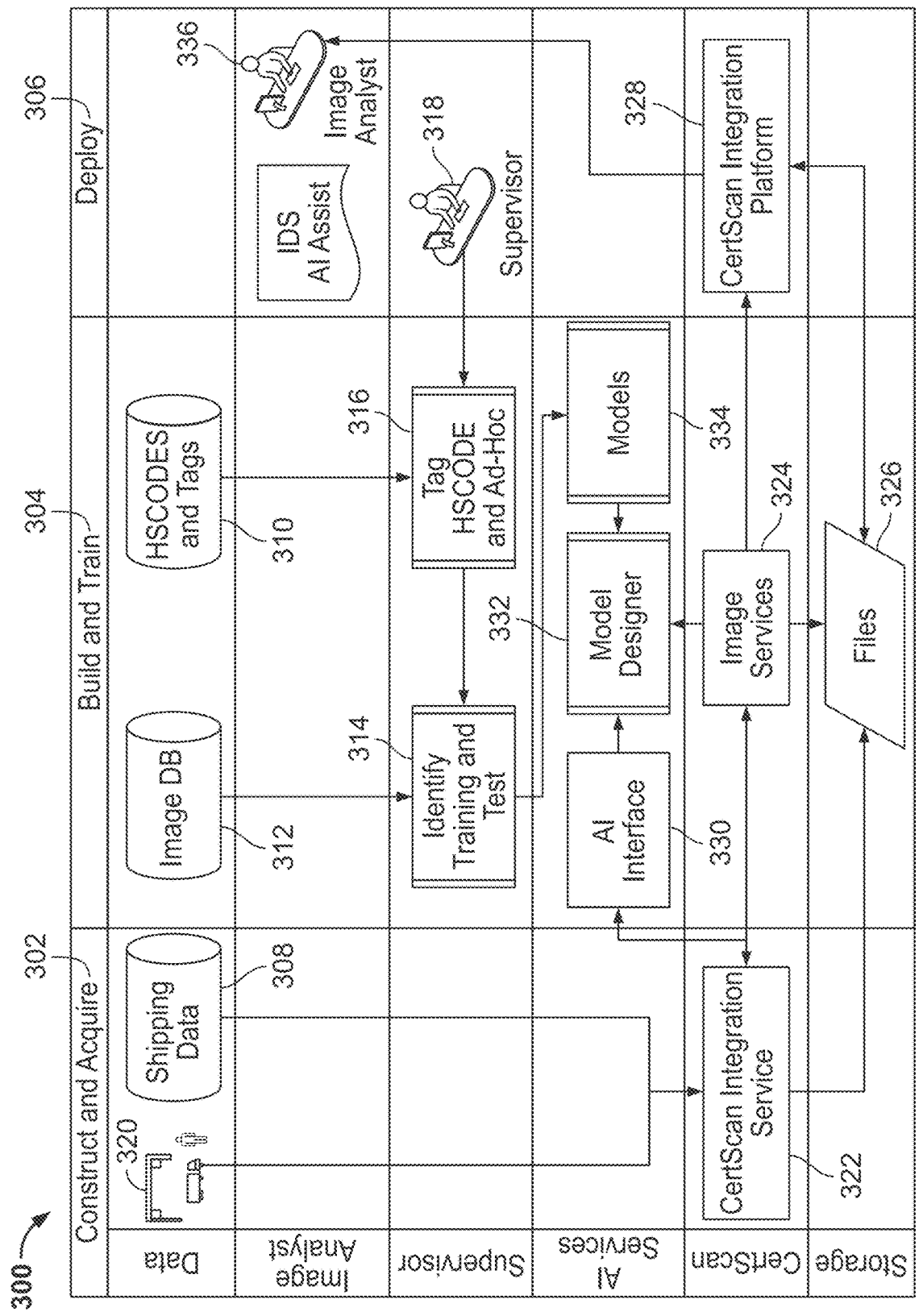
FIG. 3A illustrates a multi-platform AI service architecture, according to an embodiment of the present disclosure.
Figure 3B:
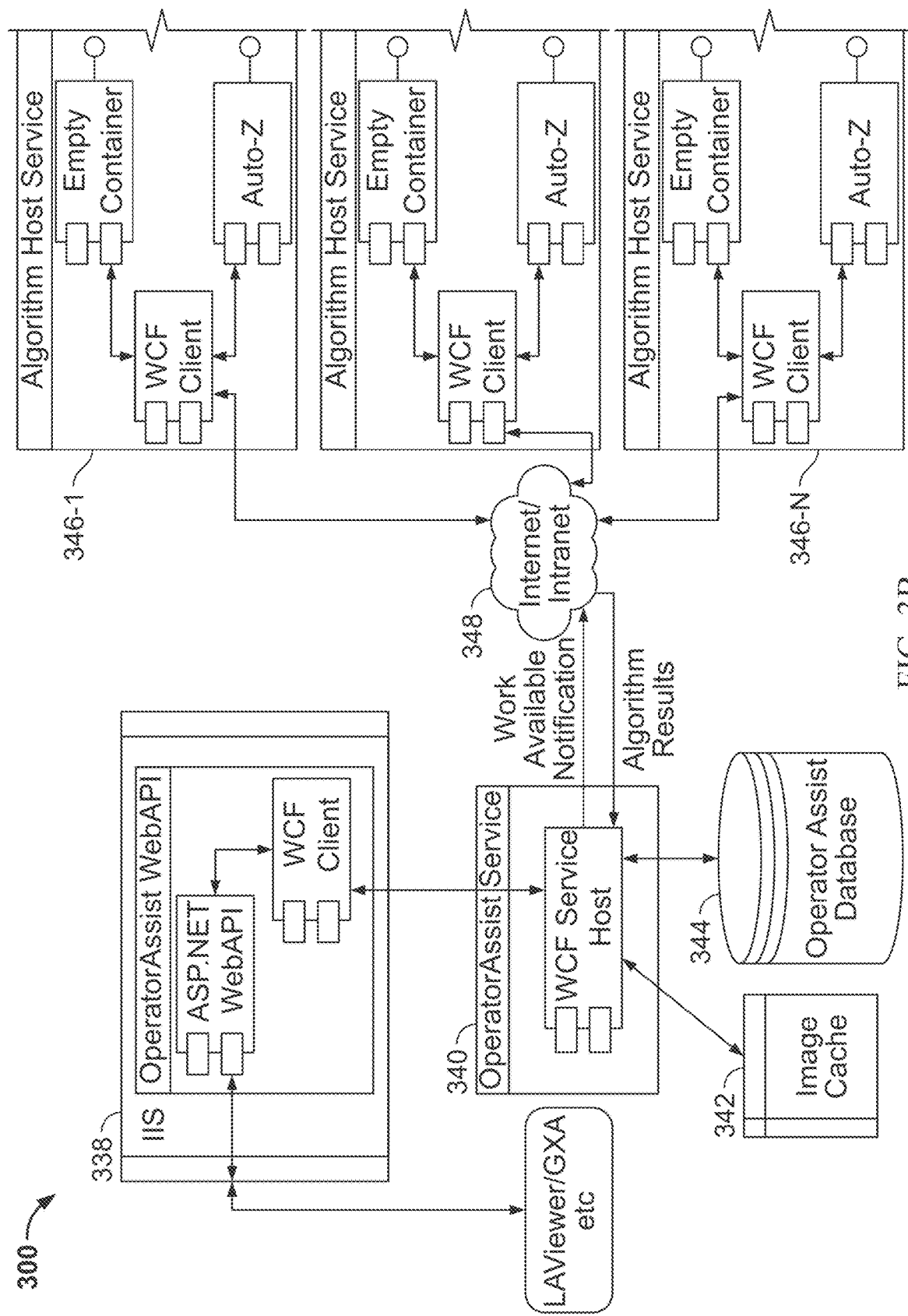
FIG. 3B illustrates a block diagram of a different view of the multi-platform AI service architecture, according to an embodiment of the present disclosure.

FIG. 3A illustrates a multi-platform AI service architecture 300, according to an embodiment of the present disclosure. In one illustrated embodiment, the multi-platform AI service architecture 300 may include a construct and acquire module 302, a build and train module 304, and a deploy module 306, without departing from the scope of the invention. FIG. 3A is described in conjunction with FIG. 3B that illustrates a block diagram of a different view of the multi-platform AI service architecture, according to an embodiment of the present disclosure. It can be noted that FIGS. 3A and 3B illustrate two different views of the same architecture.

In one embodiment, the construct and acquire module 302 may acquire one or more images and tag one or more images with one or more descriptors. Further, the build and train module 304 may apply one of numerous different AI platforms or algorithmic approaches and generate an AI module (or neural network) that has a weighted set of nodes. Further, the deploy module 306 may apply the AI module to an image to determine if the contents of the image may comport with the one or more descriptors. For example, the deploy module 306 determines that a particular image indicates that the cargo comprises 99% bananas. In one embodiment, the multi-platform AI service architecture 300 may receive an instruction from an operator workstation in data communication with at least one of the one or more inspection systems to apply one of a plurality of different AI models to an image representative of the cargo.

Figure 4:
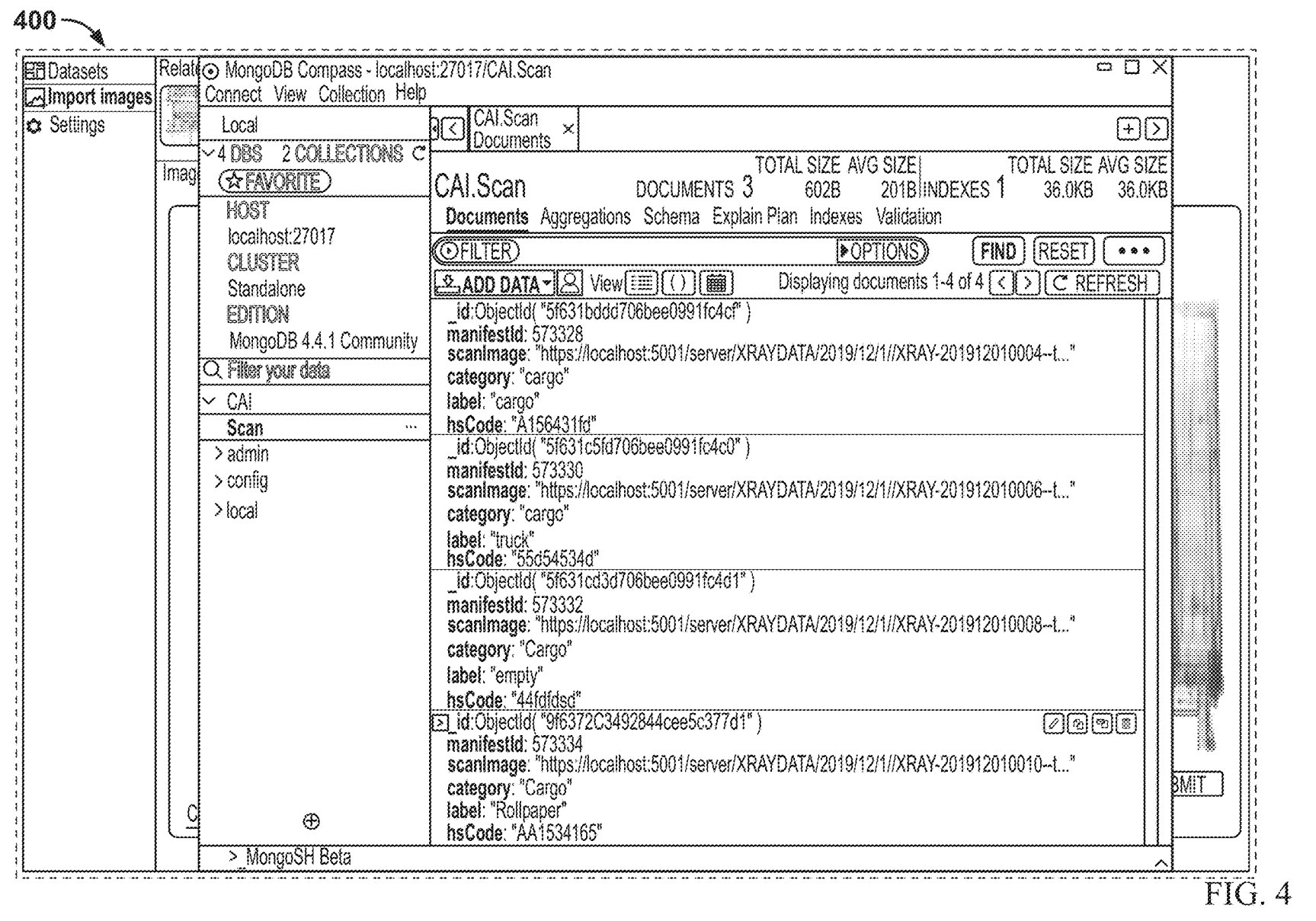

At first, an inspection system data 320 and shipping data 308 i.e. manifest data may be entered into a computing platform 322. An example image of the manifest data is shown in FIG. 4. In one case, the computing platform 322 may be an Integration service. Further, the shipping data 308 may be acquired from a cargo-manifest received from a sender of an object. Further, the object may be a cargo container.

In one embodiment, the shipping data 308 may include a harmonized system (HS) CODES and tags (as shown by 310) from the cargo manifest. It can be noted that the HS Codes may be used throughout the export process for goods. Further, the Harmonized System is a standardized numerical method of classifying traded products. In another embodiment, the shipping data 308 may also include an electronic or physical document having descriptive information about the cargo container such as, but not limited to, bills, the shipment consigner, consignee, cargo description, amount, value, origin, and destination.

Further, the computing platform 322 may store the data into a file system 326 and concurrently send the information to an image service platform 324 to apply the one or more different AI models. Successively, the image service platform 324 may also send the data to a software platform 328. The software platform 328 may facilitate an operator 336 such as an image analyst to access the acquired images and shipping data and apply one or more AI models through the image service module 324. In one case, the software platform 328 may be an integration platform.

In one embodiment, the AI models may be on any of a multitude of different native formats. Further, the use of AI models may be irrespective of their physical location. The multi-platform AI service architecture 300 may abstract an interface that may allow any image to be subjected to any AI model. For example, the multi-platform AI service architecture 300 will allow Costa Rica to develop a banana specific AI model, host it, and make it available to any port in the world. In an illustrated embodiment, as shown in FIG. 3B, an operator/assist model 338 may instruct the image services i.e. operator assist service 340 that may acquire one or more images from image cache 342 or an operator assist database 344 and then, over the Internet/Intranet 348, may interact with one of several different native platforms 346-1 . . . 346-N, to apply an AI model to the image. In one embodiment, the operator/assist model 338 may be an operator assist webAPI. Further, the different native platforms 346-1 . . . 346-N may correspond to different application host services.

Further, the operator 336 may be configured to analyze the data received from the software platform 328 to detect one or more contrabands in the object. In one case, the operator 336 may verify the object based on the absence of the one or more contrabands in the object. In another case, the operator 336 may raise an alarm on detection of the one or more contrabands in the object.

It should be noted that the AI models may include one or more AI interfaces 330 that may communicatively be coupled to the computing platform 322 to receive the integrated data from the computing platform 322. Further, the AI models may include a model designer 332 to train one or more models (as shown by 334). Further, one or more models may be trained using historical data and data received from one or more images services. In one case, the one or more models may be Machine Learning (ML) models. Further, in order to train the AI models, one or more images may be acquired from the image database 312 and identified as training data and test data (as shown by 314). Successively, the acquired one or more images may be tagged with one or more descriptors such as HS CODES and Ad-Hoc (as shown by 316) and one of numerous different AI platforms or algorithmic approaches may be applied to generate an AI module (or neural network) that has a weighted set of nodes which, when applied to an image, can determine whether the contents of the image comport with the one or more descriptors, i.e. if the images indicate that the cargo is 99% banana.

FIG. 4 illustrates a graphical user interface (GUI) 400 that an operator may use to order a prediction of cargo contents. It should be noted that the GUI 400 may display manifest data which may be received from a sender of the object. In one case, the manifest data may include HS CODES and tags related to the object. In another case, the manifest data may be an electronic or physical document having descriptive information about the object including, but not limited to, bills, the shipment consigner, consignee, cargo description, amount, value, origin, and destination. In one embodiment, the GUI 400 may allow a user to find a particular manifest data. Further, the GUI 400 may provide search criteria for displaying information related to a particular keyword. In another embodiment, the GUI 400 may facilitate the user to reset the search criteria for a new keyword.

Figure 5:
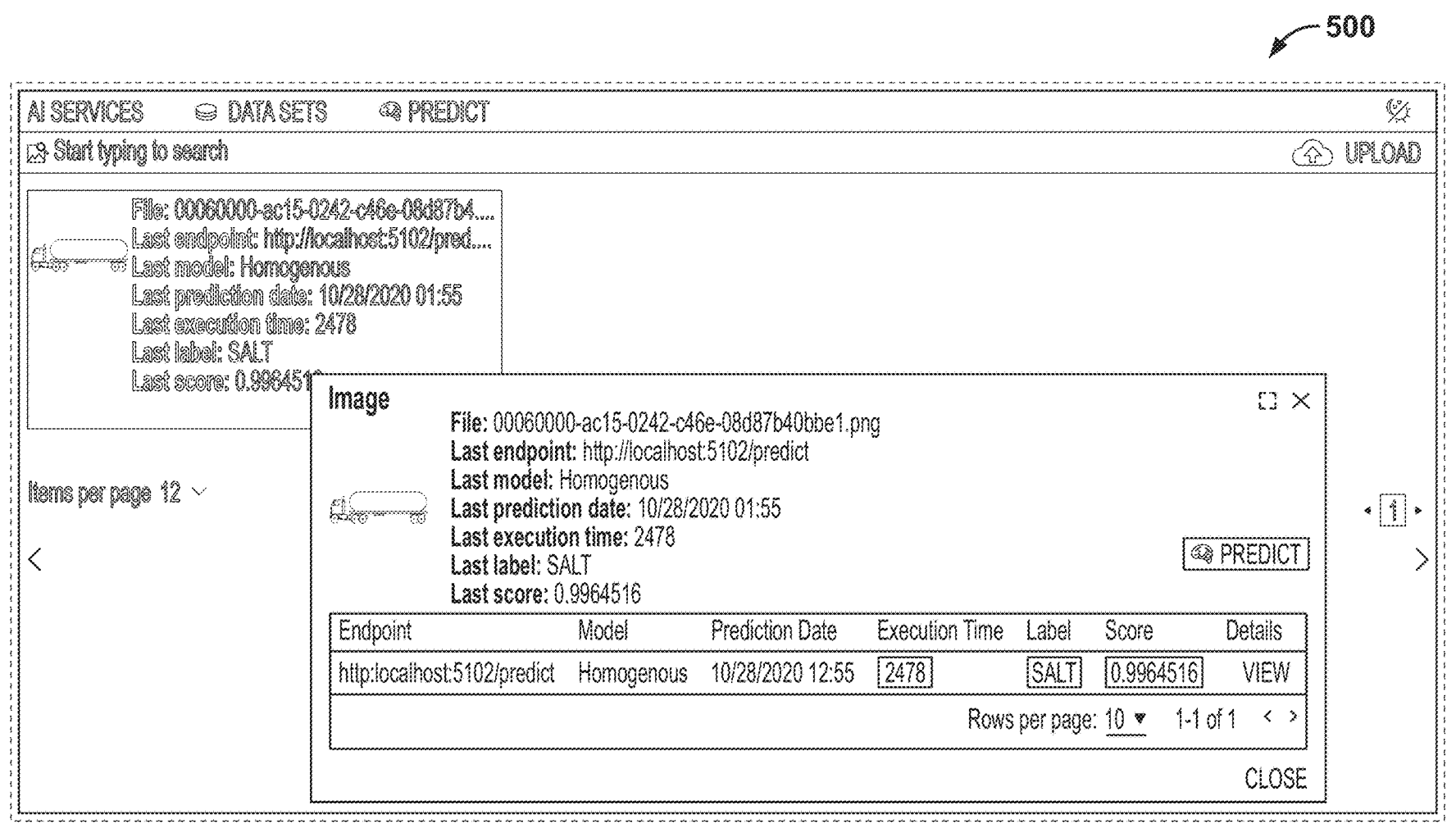

FIG. 5 illustrates a graphical user interface (GUI) 500 which may facilitate an operator to see manifest data (such as empty or rollpaper) of a specific image. The GUI 500 may facilitate a user with a received output based on the analysis of an object. The output may include an indication of an extent the contents of the object are in accordance with the manifest data and shipping data. In an additional embodiment, the received output may also include an indication of the presence of contrabands such as explosives, narcotics, counterfeit goods, undisclosed currency, chemical, and nuclear weapons in the object. In one embodiment, the presence of contrabands or mismatch of contents of the object may raise an alarm. FIG. 5 may be described in conjunction with FIG. 6.

Operator Workflow

Figure 6:
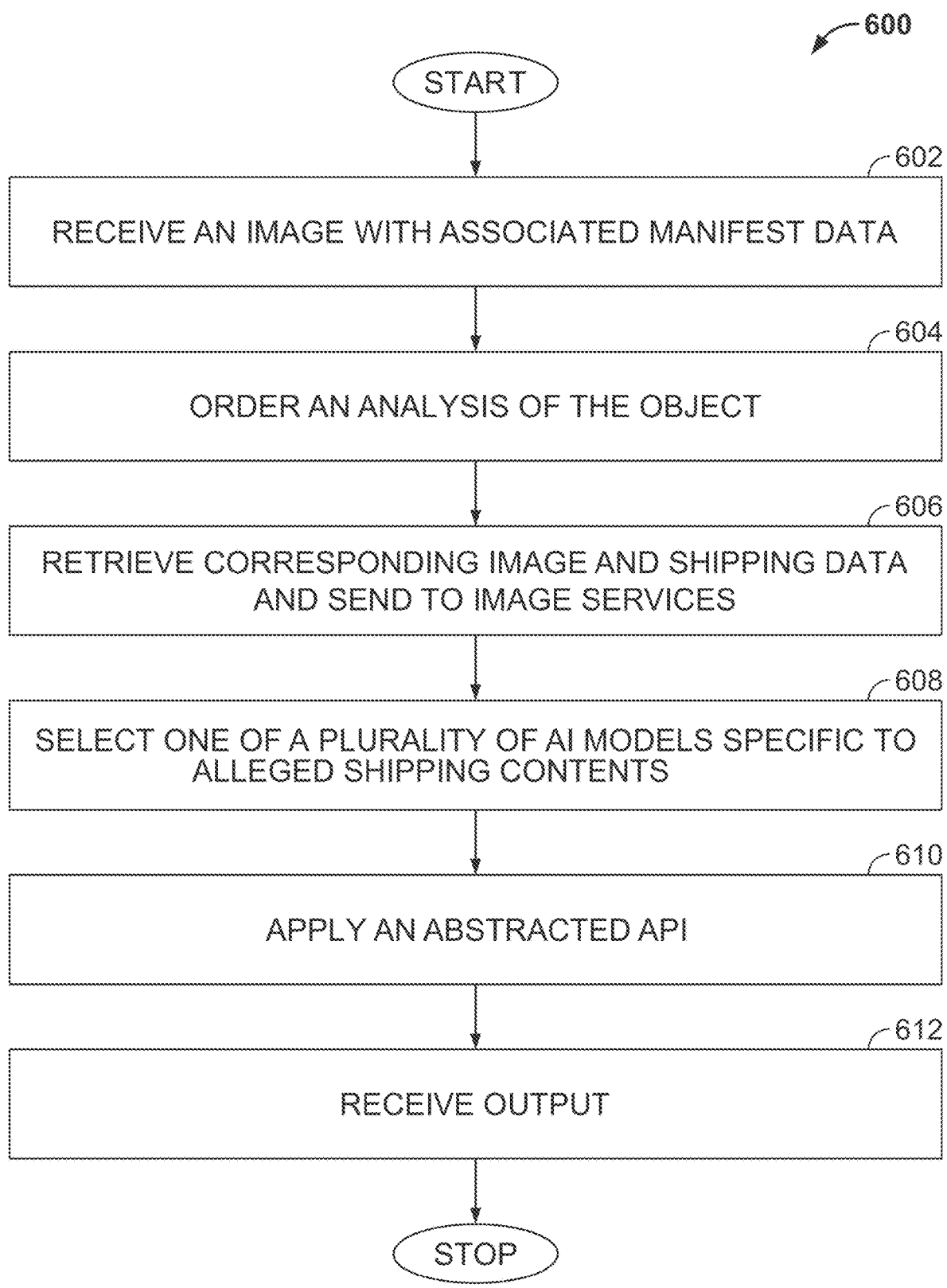
FIG. 6 illustrates a flow chart showing an operator workflow for enabling a plurality of different artificial intelligence models to be applied to image data acquired from one or more inspection systems, according to an embodiment of the present disclosure.

FIG. 6 illustrates a flow chart 600 showing an operator workflow for enabling a plurality of different artificial intelligence models to be applied to image data acquired from one or more inspection systems. FIG. 6 comprises a flowchart 600 that is explained in conjunction with the elements disclosed in FIGS. 1, 2A, 2B 3A, 3B, 4, and 5.

The flowchart 600 of FIG. 6 shows the architecture, functionality, and operation relating to a method for a security inspection operation. In this regard, each block may represent a module, segment, or portion of code, which comprises one or more executable instructions for implementing the specified logical function(s). It should also be noted that in some alternative implementations, the functions noted in the blocks may occur out of the order noted in the drawings. For example, two blocks shown in succession in FIG. 6 may be executed substantially concurrently or the blocks may sometimes be executed in the reverse order, depending upon the functionality involved. Any process descriptions or blocks in flowcharts should be understood as representing modules, segments, or portions of code that include one or more executable instructions for implementing specific logical functions or steps in the process, and alternate implementations are included within the scope of the example embodiments in which functions may be executed out of order from that shown or discussed, including substantially concurrently or in reverse order, depending on the functionality involved. Also, the process descriptions or blocks in flow charts should be understood as representing decisions made by a hardware structure such as a state machine. The flowchart 600 starts at step 602 and proceeds to step 612.

At first, an image associated with manifest data may be received, in accordance with an embodiment, at step 602. An example of image associated with manifest data is shown in FIG. 4. It should be noted that the manifest data may be received from a sender of the object. In one case, the manifest data may include HS CODES and tags related to the object. In another case, the manifest data may be an electronic or physical document having descriptive information about the object including, but not limited to, bills, the shipment consigner, consignee, cargo description, amount, value, origin, and destination.

Successively, an analysis of the object may be ordered, in accordance with an embodiment, at step 604. The analysis of the object may include determining that the contents of the object are in accordance with the manifest data. In an additional embodiment, the analysis may also include determining that the object does not include contrabands such as explosives, narcotics, counterfeit goods, undisclosed currency, chemical, and nuclear weapons.

Successively, images and shipping data corresponding to the object may be received and sent to the images services, in accordance with an embodiment, at step 606. Further, the images may be received from the inspection module 208 and the shipping data may be received from the database 202. In one case, the inspection module 208 may be an X-ray scanning device configured to capture one or more X-ray images of the cargo container. In another case, the inspection module 208 may be a scanning device based on other forms of radiation, including microwave or gamma/neutron.

Successively, one of a plurality of AI models specific to alleged shipping contents may be selected, in accordance with an embodiment, at step 608. It should be noted that each of the plurality of AI models may be based on the shipping contents such as fruits, roll papers, electronics, mechanical device, instruments, household objects, etc. It should also be noted that the plurality of AI models may also include an AI model based on an empty object i.e. no shipping contents. In one embodiment, the image may be submitted to the one of the plurality of different artificial intelligence models using the application program interface. Furthermore, in one embodiment the system automatically recommends the application of a specific one of the AI models based on a) manifest or descriptive data of the cargo, b) an initial radiological analysis of the cargo indicating that the cargo contains a particular type of good, or c) a historical type of good typically passing through the inspection system by that carrier, at that time of year, at that time of day, from that origin, or to that destination.

Successively, an abstracted API may be applied, in accordance with an embodiment, at step 610. The API may enable the image to be subjected to the selected AI model that may be in a different native programmatic format. In one embodiment, the application program interface (API) may be acquired, specific to that one of the plurality of different AI models, wherein the application program interface is configured to enable the one of the plurality of different artificial intelligence models to be applied to the image. In one embodiment, the one of the plurality of different artificial intelligence models may exchange data representative of a degree to which the cargo in the image corresponds to an expected type of cargo based upon descriptive data associated with the cargo.

Thereafter, an output may be received, in accordance with an embodiment, at step 612. In one embodiment, data representative of the degree to which the cargo in the image corresponds to the expected type of cargo may be transmitted to the operator workstation to be displayed to the operator.

The disclosed embodiments encompass numerous advantages. Various embodiments of the hibernation system and method for security inspection operation have been disclosed. Such a method may route or map Integration Service data (images) to a specific published API interface running on an Algorithm Server such as Google TensorFlow® or other web services. Further, such a method enables an abstraction from AI Services by exposing a service API such as 'IsEmptyContainer' and returns results consumed by AI Services. Further, such a method allows the creation of datasets and label or tag known/obvious images for building AI models and use a stream of commerce images to predict contrabands without human examination and evaluation.

Such a method facilitates a cost-effective solution with low-cost deployment, an adaptable solution with minimized API development, and a scalable solution with automated processes with AI. Such a system and method for security inspection operation extend the data collection to usage by open AI platforms with information and identifiers provided by an image analyst.

The detailed description section of the application should state that orders of method steps are not critical. Such recitations would later support arguments that the step order in a method claim is not critical or fixed. Features that are described and/or illustrated with respect to one embodiment may be used in the same way or in a similar way in one or more other embodiments and/or in combination with or instead of the features of the other embodiments.

While the above embodiments have been illustrated and described, as noted above, many changes can be made without departing from the scope of the embodiments. For example, aspects of the subject matter disclosed herein may be adopted on alternative operating systems. Accordingly, the scope of the embodiments is not limited by the disclosure of the embodiment. Instead, the embodiments should be determined entirely by reference to the claims that follow.

What is claimed is:

1. A computer readable non-transitory medium comprising a plurality of executable programmatic instructions that, when executed in a computer system, enables a plurality of different artificial intelligence models to be applied to image data, wherein the image data is acquired from one or more inspection systems and wherein the plurality of executable programmatic instructions, when executed:
   automatically generates a recommendation to apply a specific one of the plurality of different artificial intelligence models to the image data, wherein the image data is at least partially representative of cargo, wherein said image data has manifest data associated therewith, and wherein said recommendation is generated based on at least one of a) the manifest data, b) a radiological analysis of the cargo indicating that the cargo contains a particular type of good, and c) an expected type of good based on at least one of a carrier of the cargo, a time of year, a time of day, an origin, and a destination;
   receives an instruction to apply the recommended one of the plurality of different artificial intelligence models to said image data, and wherein said instruction is received from an operator workstation in data communication with at least one of the one or more inspection systems;
   acquires an application program interface specific to said recommended one of the plurality of different artificial intelligence models, wherein the application program interface is configured to enable the recommended one of the plurality of different artificial intelligence models to be applied to the image;

causes the one of the plurality of different artificial intelligence models to be applied to the image data using the acquired application program interface;

receives from the recommended one of the plurality of different artificial intelligence models data representative of a degree to which said cargo in the image data corresponds to an expected type of cargo based upon the manifest data associated with said cargo; and transmits the data representative of the degree to which the cargo in the image corresponds to the expected type of cargo to the operator workstation and cause said data representative of the degree to which the cargo in the image data corresponds to the expected type of cargo to be displayed on the operator workstation.

2. The computer readable non-transitory medium of claim 1, wherein each of the plurality of different artificial intelligence models are specific to one type of cargo, to one type of threat, and/or to one type of illegal contraband.

3. The computer readable non-transitory medium of claim 2, wherein each of the plurality of different artificial intelligence models is in a different native programming format.

4. The computer readable non-transitory medium of claim 3, wherein each of the application program interfaces is specifically adapted to interface with only one of the plurality of different artificial intelligence models.

5. The computer readable non-transitory medium of claim 1, wherein at least some of the plurality of different artificial intelligence models are in native programming formats that are different from each other.

6. The computer readable non-transitory medium of claim 5, wherein each of the application program interfaces is specifically adapted to interface with only one of the plurality of different artificial intelligence models.

7. The computer readable non-transitory medium of claim 1, wherein at least some of the plurality of different artificial intelligence models are hosted on computing devices physically and logically distinct and separate from the computer system.

8. The computer readable non-transitory medium of claim 1, further comprising programmatic instructions that, when executed, train at least one of the plurality of different artificial intelligence models based on image data acquired in real-time from at least one of the one or more inspection systems.

9. The computer readable non-transitory medium of claim 1, wherein the image data comprises at least one of two-dimensional X-ray images, three-dimensional X-ray images, tomographic X-ray images, multi-energy X-ray images, backscatter X-ray images, and transmission X-ray images.

10. The computer readable non-transitory medium of claim 1, further comprising programmatic instructions that, when executed, receive the image data and the manifest data associated with the cargo.

11. The computer readable non-transitory medium of claim 1, further comprising programmatic instructions that, when executed, determine a degree of correlation between the manifest data associated with the image and the data representative of the degree to which the cargo in the image corresponds to the expected type of cargo.

12. The computer readable non-transitory medium of claim 11, further comprising programmatic instructions that, when executed, transmit a value indicative of a degree of correlation to which the cargo in the image data corresponds to the expected type of cargo to the operator workstation.

13. The computer readable non-transitory medium of claim 1, wherein the manifest data is an electronic or physical document and comprises descriptive information about the cargo.

14. A method of enabling a plurality of different artificial intelligence models to be applied to image data, wherein the image data is acquired from one or more inspection systems, the method being implemented by a computing device having one or more physical processors programmed with a plurality of executable programmatic instructions that, when executed by the one or more physical processors, cause the computing device to perform said method, said method comprising:

automatically generating a recommendation to apply a specific one of the plurality of different artificial intelligence models to the image data, wherein the image data is at least partially representative of cargo, wherein said image data has manifest data associated therewith, and wherein said recommendation is generated based on at least one of a) the manifest data, b) a radiological analysis of the cargo indicating that the cargo contains a particular type of good, and c) an expected type of good based on at least one of a carrier of the cargo, a time of year, a time of day, an origin, and a destination;

receiving an instruction to apply the recommended one of the plurality of different artificial intelligence models to said image data, and wherein said instruction is received from an operator workstation in data communication with at least one of the one or more inspection systems;

acquiring an application program interface specific to said recommended one of the plurality of different artificial intelligence models, wherein the application program interface is configured to enable the recommended one of the plurality of different artificial intelligence models to be applied to the image;

causing the one of the plurality of different artificial intelligence models to be applied to the image data using the acquired application program interface;

receiving from the recommended one of the plurality of different artificial intelligence models data representative of a degree to which said cargo in the image data corresponds to an expected type of cargo based upon the manifest data associated with said cargo; and transmitting the data representative of the degree to which the cargo in the image corresponds to the expected type of cargo to the operator workstation and cause said data representative of the degree to which the cargo in the image data corresponds to the expected type of cargo to be displayed on the operator workstation.

15. The method of claim 14, wherein each of the plurality of different artificial intelligence models are specific to one type of cargo, to one type of threat, and/or to one type of illegal contraband.

16. The method of claim 15, wherein each of the plurality of different artificial intelligence models is in a different native programming format.

17. The method of claim 16, wherein each of the application program interfaces is specifically adapted to interface with only one of the plurality of different artificial intelligence models.

18. The method of claim 14, wherein at least some of the plurality of different artificial intelligence models are in native programming formats that are different from each other.

19. The method of claim 18, wherein each of the application program interfaces is specifically adapted to interface with only one of the plurality of different artificial intelligence models.

20. The method of claim 14, wherein at least some of the plurality of different artificial intelligence models are hosted on computing devices physically and logically distinct and separate from the computer system.

21. The method of claim 14, further comprising training at least one of the plurality of different artificial intelligence models based on image data acquired in real-time from at least one of the one or more inspection systems.

22. The method of claim 14, wherein the image data comprises at least one of two-dimensional X-ray images, three-dimensional X-ray images, tomographic X-ray images, multi-energy X-ray images, backscatter X-ray images, and transmission X-ray images.

23. The method of claim 14, further comprising receiving the image data and the manifest data associated with the cargo.

24. The method of claim 23, further comprising determining a degree of correlation between the manifest data associated with the image and the data representative of the degree to which the cargo in the image corresponds to the expected type of cargo.

25. The method of claim 24, further comprising transmitting a value indicative of a degree of correlation to which the cargo in the image data corresponds to the expected type of cargo to the operator workstation.

26. The method of claim 14, wherein the manifest data is an electronic or physical document and comprises descriptive information about the cargo.

* * * * *